US012205813B2

(12) United States Patent
Wildgoose et al.

(10) Patent No.: US 12,205,813 B2
(45) Date of Patent: Jan. 21, 2025

(54) MULTIPLEXED TIME OF FLIGHT MASS SPECTROMETER

(71) Applicant: Micromass UK Limited, Wilmslow (GB)

(72) Inventors: Jason Lee Wildgoose, Stockport (GB); John Brian Hoyes, Stockport (GB); Richard Denny, Newcaste-under-Lyme (GB)

(73) Assignee: Micromass UK Limited, Wilmslow (GB)

( * ) Notice: Subject to any disclaimer, the term of this patent is extended or adjusted under 35 U.S.C. 154(b) by 399 days.

(21) Appl. No.: 17/440,998

(22) PCT Filed: Feb. 27, 2020

(86) PCT No.: PCT/GB2020/050471
§ 371 (c)(1),
(2) Date: Sep. 20, 2021

(87) PCT Pub. No.: WO2020/188236
PCT Pub. Date: Sep. 24, 2020

(65) Prior Publication Data

US 2022/0165560 A1 May 26, 2022

(30) Foreign Application Priority Data

Mar. 20, 2019 (GB) ...................................... 1903779

(51) Int. Cl.
*H01J 49/40* (2006.01)
*H01J 49/00* (2006.01)

(52) U.S. Cl.
CPC .......... *H01J 49/40* (2013.01); *H01J 49/0036* (2013.01)

(58) Field of Classification Search
CPC ..... H01J 49/40; H01J 49/0036; H01J 49/0031
See application file for complete search history.

(56) References Cited

U.S. PATENT DOCUMENTS 3,898,452 A 8/1975 Hertel
4,390,784 A 6/1983 Browning et al.
(Continued)

FOREIGN PATENT DOCUMENTS

CA 2412657 C 5/2003
CN 101171660 A 4/2008
(Continued)

OTHER PUBLICATIONS

International Search Report and Written Opinion for International Application No. PCT/GB2020/050471, mailed May 13, 2020.
(Continued)

*Primary Examiner* — David E Smith
*Assistant Examiner* — Christopher J Gassen
(74) *Attorney, Agent, or Firm* — Goodwin Procter LLP

(57) ABSTRACT

A method of time of flight (ToF) mass spectrometry comprising: pushing ions into a ToF mass analyser in a plurality of pushes, wherein the time spacing between adjacent pushes is shorter than either the longest flight time, or the range of flight times, of the ions; detecting the ions so as to obtain spectral data; decoding the spectral data to determine first mass spectral data relating to ions pushed into the ToF mass analyser by a first plurality of the pushes (P1-P4), and allocating this first mass spectral data to a first time stamp (t1); and decoding the spectral data to determine second mass spectral data relating to ions pushed into the ToF mass analyser by a second plurality of the pushes (P5-P8), and allocating this second mass spectral data to a second time-stamp (t2); wherein the first and second time-stamps have a time difference therebetween that is shorter than said longest flight time, or said range of flight times (4), in the ToF mass analyser.

17 Claims, 5 Drawing Sheets

(56) References Cited

U.S. PATENT DOCUMENTS

| | | | |
|---|---|---|---|
| 4,691,160 | A | 9/1987 | Ino |
| 4,731,532 | A | 3/1988 | Frey et al. |
| 4,855,595 | A | 8/1989 | Blanchard |
| 4,970,390 | A | 11/1990 | Szymczak |
| 5,017,780 | A | 5/1991 | Kutscher et al. |
| 5,107,109 | A | 4/1992 | Stafford, Jr. et al. |
| 5,128,543 | A | 7/1992 | Reed et al. |
| 5,202,563 | A | 4/1993 | Cotter et al. |
| 5,331,158 | A | 7/1994 | Dowell |
| 5,367,162 | A | 11/1994 | Holland et al. |
| 5,396,065 | A | 3/1995 | Myerholtz et al. |
| 5,435,309 | A | 7/1995 | Thomas et al. |
| 5,464,985 | A | 11/1995 | Cornish et al. |
| 5,619,034 | A | 4/1997 | Reed et al. |
| 5,652,427 | A | 7/1997 | Whitehouse et al. |
| 5,654,544 | A | 8/1997 | Dresch |
| 5,689,111 | A | 11/1997 | Dresch et al. |
| 5,696,375 | A | 12/1997 | Park et al. |
| 5,719,392 | A | 2/1998 | Franzen |
| 5,763,878 | A | 6/1998 | Franzen |
| 5,777,326 | A | 7/1998 | Rockwood et al. |
| 5,834,771 | A | 11/1998 | Yoon et al. |
| 5,847,385 | A | 12/1998 | Dresch |
| 5,869,829 | A | 2/1999 | Dresch |
| 5,896,829 | A | 4/1999 | Rothenberg et al. |
| 5,955,730 | A | 9/1999 | Kerley et al. |
| 5,994,695 | A | 11/1999 | Young |
| 6,002,122 | A | 12/1999 | Wolf |
| 6,013,913 | A | 1/2000 | Hanson |
| 6,020,586 | A | 2/2000 | Dresch et al. |
| 6,080,985 | A | 6/2000 | Welkie et al. |
| 6,107,625 | A | 8/2000 | Park |
| 6,160,256 | A | 12/2000 | Ishihara |
| 6,198,096 | B1 | 3/2001 | Le Cocq |
| 6,229,142 | B1 | 5/2001 | Bateman et al. |
| 6,271,917 | B1 | 8/2001 | Hagler |
| 6,300,626 | B1 | 10/2001 | Brock et al. |
| 6,316,768 | B1 | 11/2001 | Rockwood et al. |
| 6,337,482 | B1 | 1/2002 | Francke |
| 6,384,410 | B1 | 5/2002 | Kawato |
| 6,393,367 | B1 | 5/2002 | Tang et al. |
| 6,437,325 | B1 | 8/2002 | Reilly et al. |
| 6,455,845 | B1 | 9/2002 | Li et al. |
| 6,469,295 | B1 | 10/2002 | Park |
| 6,489,610 | B1 | 12/2002 | Barofsky et al. |
| 6,504,148 | B1 | 1/2003 | Hager |
| 6,504,150 | B1 | 1/2003 | Verentchikov et al. |
| 6,534,764 | B1 | 3/2003 | Verentchikov et al. |
| 6,545,268 | B1 | 4/2003 | Verentchikov et al. |
| 6,570,152 | B1 | 5/2003 | Hoyes |
| 6,576,895 | B1 | 6/2003 | Park |
| 6,580,070 | B2 | 6/2003 | Cornish et al. |
| 6,591,121 | B1 | 7/2003 | Madarasz et al. |
| 6,614,020 | B2 | 9/2003 | Cornish |
| 6,627,877 | B1 | 9/2003 | Davis et al. |
| 6,646,252 | B1 | 11/2003 | Gonin |
| 6,647,347 | B1 | 11/2003 | Roushall et al. |
| 6,664,545 | B2 | 12/2003 | Kimmel et al. |
| 6,683,299 | B2 | 1/2004 | Fuhrer et al. |
| 6,694,284 | B1 | 2/2004 | Nikoonahad et al. |
| 6,717,132 | B2 | 4/2004 | Franzen |
| 6,734,968 | B1 | 5/2004 | Wang et al. |
| 6,737,642 | B2 | 5/2004 | Syage et al. |
| 6,744,040 | B2 | 6/2004 | Park |
| 6,744,042 | B2 | 6/2004 | Zajfman et al. |
| 6,747,271 | B2 | 6/2004 | Gonin et al. |
| 6,770,870 | B2 | 8/2004 | Vestal |
| 6,782,342 | B2 | 8/2004 | LeGore et al. |
| 6,787,760 | B2 | 9/2004 | Belov et al. |
| 6,794,643 | B2 | 9/2004 | Russ, IV et al. |
| 6,804,003 | B1 | 10/2004 | Wang et al. |
| 6,815,673 | B2 | 11/2004 | Plomley et al. |
| 6,833,544 | B1 | 12/2004 | Campbell et al. |
| 6,836,742 | B2 | 12/2004 | Brekenfeld |
| 6,841,936 | B2 | 1/2005 | Keller et al. |
| 6,861,645 | B2 | 3/2005 | Franzen |
| 6,864,479 | B1 | 3/2005 | Davis et al. |
| 6,870,156 | B2 | 3/2005 | Rather |
| 6,870,157 | B1 | 3/2005 | Zare |
| 6,872,938 | B2 | 3/2005 | Makarov et al. |
| 6,888,130 | B1 | 5/2005 | Gonin |
| 6,900,431 | B2 | 5/2005 | Belov et al. |
| 6,906,320 | B2 | 6/2005 | Sachs et al. |
| 6,940,066 | B2 | 9/2005 | Makarov et al. |
| 6,949,736 | B2 | 9/2005 | Ishihara |
| 7,034,292 | B1 | 4/2006 | Whitehouse et al. |
| 7,071,464 | B2 | 7/2006 | Reinhold |
| 7,084,393 | B2 | 8/2006 | Fuhrer et al. |
| 7,091,479 | B2 | 8/2006 | Hayek |
| 7,126,114 | B2 | 10/2006 | Chernushevich |
| 7,196,324 | B2 | 3/2007 | Verentchikov |
| 7,217,919 | B2 | 5/2007 | Boyle et al. |
| 7,221,251 | B2 | 5/2007 | Menegoli et al. |
| 7,326,925 | B2 | 2/2008 | Verentchikov et al. |
| 7,351,958 | B2 | 4/2008 | Vestal |
| 7,365,313 | B2 | 4/2008 | Fuhrer et al. |
| 7,385,187 | B2 | 6/2008 | Verentchikov et al. |
| 7,388,197 | B2 | 6/2008 | McLean et al. |
| 7,399,957 | B2 | 7/2008 | Parker et al. |
| 7,423,259 | B2 | 9/2008 | Hidalgo et al. |
| 7,498,569 | B2 | 3/2009 | Ding |
| 7,501,621 | B2 | 3/2009 | Willis et al. |
| 7,504,620 | B2 | 3/2009 | Sato et al. |
| 7,521,671 | B2 | 4/2009 | Kirihara et al. |
| 7,541,576 | B2 | 6/2009 | Belov et al. |
| 7,582,864 | B2 | 9/2009 | Verentchikov |
| 7,608,817 | B2 | 10/2009 | Flory |
| 7,663,100 | B2 | 2/2010 | Vestal |
| 7,675,031 | B2 | 3/2010 | Konicek et al. |
| 7,709,789 | B2 | 5/2010 | Vestal et al. |
| 7,728,289 | B2 | 6/2010 | Naya et al. |
| 7,745,780 | B2 | 6/2010 | McLean et al. |
| 7,755,036 | B2 | 7/2010 | Satoh |
| 7,772,547 | B2 | 8/2010 | Verentchikov |
| 7,800,054 | B2 | 9/2010 | Fuhrer et al. |
| 7,825,373 | B2 | 11/2010 | Willis et al. |
| 7,863,557 | B2 | 1/2011 | Brown |
| 7,884,319 | B2 | 2/2011 | Willis et al. |
| 7,932,491 | B2 | 4/2011 | Vestal |
| 7,982,184 | B2 | 7/2011 | Sudakov |
| 7,985,950 | B2 | 7/2011 | Makarov et al. |
| 7,989,759 | B2 | 8/2011 | Holle |
| 7,999,223 | B2 | 8/2011 | Makarov et al. |
| 8,017,907 | B2 | 9/2011 | Willis et al. |
| 8,017,909 | B2 | 9/2011 | Makarov et al. |
| 8,063,360 | B2 | 11/2011 | Willis et al. |
| 8,080,782 | B2 | 12/2011 | Hidalgo et al. |
| 8,093,554 | B2 | 1/2012 | Makarov |
| 8,237,111 | B2 | 8/2012 | Golikov et al. |
| 8,354,634 | B2 | 1/2013 | Green et al. |
| 8,373,120 | B2 | 2/2013 | Verentchikov |
| 8,395,115 | B2 | 3/2013 | Makarov et al. |
| 8,492,710 | B2 | 7/2013 | Fuhrer et al. |
| 8,513,594 | B2 | 8/2013 | Makarov |
| 8,633,436 | B2 | 1/2014 | Ugarov |
| 8,637,815 | B2 | 1/2014 | Makarov et al. |
| 8,642,948 | B2 | 2/2014 | Makarov et al. |
| 8,642,951 | B2 | 2/2014 | Li |
| 8,648,294 | B2 | 2/2014 | Prather et al. |
| 8,653,446 | B1 | 2/2014 | Mordehai et al. |
| 8,658,984 | B2 | 2/2014 | Makarov et al. |
| 8,680,481 | B2 | 3/2014 | Giannakopulos et al. |
| 8,723,108 | B1 | 5/2014 | Ugarov |
| 8,735,818 | B2 | 5/2014 | Kovtoun et al. |
| 8,772,708 | B2 | 7/2014 | Kinugawa et al. |
| 8,785,845 | B2 | 7/2014 | Loboda |
| 8,847,155 | B2 | 9/2014 | Vestal |
| 8,853,623 | B2 | 10/2014 | Verenchikov |
| 8,884,220 | B2 | 11/2014 | Hoyes et al. |
| 8,921,772 | B2 | 12/2014 | Verenchikov |
| 8,952,325 | B2 | 2/2015 | Giles et al. |
| 8,957,369 | B2 | 2/2015 | Makarov |
| 8,975,592 | B2 | 3/2015 | Kobayashi et al. |
| 9,048,080 | B2 | 6/2015 | Verenchikov et al. |

(56) References Cited

U.S. PATENT DOCUMENTS 9,082,597 B2 7/2015 Willis et al.
9,082,604 B2 7/2015 Verenchikov
9,099,287 B2 8/2015 Giannakopulos
9,136,101 B2 9/2015 Grinfeld et al.
9,147,563 B2 9/2015 Makarov
9,196,469 B2 11/2015 Makarov
9,207,206 B2 12/2015 Makarov
9,214,322 B2 12/2015 Kholomeev et al.
9,214,328 B2 12/2015 Hoyes et al.
9,281,175 B2 3/2016 Haufler et al.
9,312,119 B2 4/2016 Verenchikov
9,324,544 B2 4/2016 Rather
9,373,490 B1 6/2016 Nishiguchi et al.
9,396,922 B2 7/2016 Verenchikov et al.
9,417,211 B2 8/2016 Verenchikov
9,425,034 B2 8/2016 Verentchikov et al.
9,472,390 B2 10/2016 Verenchikov et al.
9,514,922 B2 12/2016 Watanabe et al.
9,576,778 B2 2/2017 Wang
9,595,431 B2 3/2017 Verenchikov
9,673,033 B2 6/2017 Grinfeld et al.
9,679,758 B2 6/2017 Grinfeld et al.
9,683,963 B2 6/2017 Verenchikov
9,728,384 B2 8/2017 Verenchikov
9,779,923 B2 10/2017 Verenchikov
9,786,484 B2 10/2017 Willis et al.
9,786,485 B2 10/2017 Ding et al.
9,865,441 B2 1/2018 Damoc et al.
9,865,445 B2 1/2018 Verenchikov et al.
9,870,903 B2 1/2018 Richardson et al.
9,870,906 B1 1/2018 Quarmby et al.
9,881,780 B2 1/2018 Verenchikov et al.
9,899,201 B1 2/2018 Park
9,922,812 B2 3/2018 Makarov
9,941,107 B2 4/2018 Verenchikov
9,972,483 B2 5/2018 Makarov
10,006,892 B2 6/2018 Verenchikov
10,037,873 B2 7/2018 Wang et al.
10,141,175 B2 11/2018 Verentchikov et al.
10,141,176 B2 11/2018 Stewart et al.
10,163,616 B2 12/2018 Verenchikov et al.
10,186,411 B2 1/2019 Makarov
10,192,723 B2 1/2019 Verenchikov et al.
10,290,480 B2 5/2019 Crowell et al.
10,373,815 B2 8/2019 Crowell et al.
10,388,503 B2 8/2019 Brown et al.
10,593,525 B2 3/2020 Hock et al.
10,593,533 B2 3/2020 Hoyes et al.
10,622,203 B2 4/2020 Veryovkin et al.
10,629,425 B2 4/2020 Hoyes et al.
10,636,646 B2 4/2020 Hoyes et al.
11,239,067 B2 2/2022 Verenchikov et al.
11,295,944 B2 4/2022 Verenchikov
11,328,920 B2 5/2022 Hoyes et al.
2001/0011703 A1 8/2001 Franzen
2001/0030284 A1 10/2001 Dresch et al.
2002/0030159 A1 3/2002 Chernushevich et al.
2002/0107660 A1 8/2002 Nikoonahad et al.
2002/0190199 A1 12/2002 Li
2003/0010907 A1 1/2003 Hayek et al.
2003/0111597 A1 6/2003 Gonin et al.
2003/0232445 A1 12/2003 Fulghum
2004/0026613 A1 2/2004 Bateman et al.
2004/0084613 A1 5/2004 Bateman et al.
2004/0108453 A1 6/2004 Kobayashi et al.
2004/0119012 A1 6/2004 Vestal
2004/0144918 A1 7/2004 Zare et al.
2004/0155187 A1 8/2004 Axelsson
2004/0159782 A1 8/2004 Park
2004/0164239 A1 8/2004 Franzen
2004/0183007 A1 9/2004 Belov et al.
2005/0006577 A1 1/2005 Fuhrer et al.
2005/0040326 A1 2/2005 Enke
2005/0103992 A1 5/2005 Yamaguchi et al.
2005/0133712 A1* 6/2005 Belov ................... H01J 49/401 250/287
2005/0151075 A1 7/2005 Brown et al.
2005/0194528 A1 9/2005 Yamaguchi et al.
2005/0194531 A1 9/2005 Chernushevich
2005/0242279 A1 11/2005 Verentchikov
2005/0258364 A1 11/2005 Whitehouse et al.
2006/0024720 A1 2/2006 McLean et al.
2006/0169882 A1 8/2006 Pau et al.
2006/0214100 A1 9/2006 Verentchikov et al.
2006/0289746 A1 12/2006 Raznikov et al.
2007/0023645 A1 2/2007 Chernushevich
2007/0029473 A1 2/2007 Verentchikov
2007/0158545 A1 7/2007 Verentchikov
2007/0176090 A1 8/2007 Verentchikov
2007/0187614 A1 8/2007 Schneider et al.
2007/0194223 A1 8/2007 Sato et al.
2008/0049402 A1 2/2008 Han et al.
2008/0121796 A1 5/2008 Green et al.
2008/0197276 A1 8/2008 Nishiguchi et al.
2008/0203288 A1 8/2008 Makarov et al.
2008/0290269 A1 11/2008 Saito et al.
2009/0090861 A1 4/2009 Willis et al.
2009/0114808 A1 5/2009 Bateman et al.
2009/0121130 A1 5/2009 Satoh
2009/0206250 A1 8/2009 Wollnik
2009/0250607 A1 10/2009 Staats et al.
2009/0272890 A1 11/2009 Ogawa et al.
2009/0294658 A1 12/2009 Vestal et al.
2009/0314934 A1 12/2009 Brown
2010/0001180 A1 1/2010 Bateman et al.
2010/0044558 A1 2/2010 Sudakov
2010/0072363 A1 3/2010 Giles et al.
2010/0078551 A1 4/2010 Loboda
2010/0096543 A1 4/2010 Kenny et al.
2010/0140469 A1 6/2010 Nishiguchi
2010/0193682 A1 8/2010 Golikov et al.
2010/0207023 A1 8/2010 Loboda
2010/0301202 A1 12/2010 Vestal
2011/0133073 A1 6/2011 Sato et al.
2011/0168880 A1 7/2011 Risrtroph et al.
2011/0180702 A1 7/2011 Flory et al.
2011/0180705 A1 7/2011 Yamaguchi
2011/0186729 A1 8/2011 Verentchikov et al.
2012/0168618 A1 7/2012 Vestal
2012/0261570 A1 10/2012 Shvartsburg et al.
2012/0298853 A1 11/2012 Kurulugama
2013/0048852 A1* 2/2013 Verenchikov ........... H01J 49/22 250/282
2013/0056627 A1 3/2013 Verenchikov
2013/0068942 A1 3/2013 Verenchikov
2013/0161506 A1 6/2013 Ugarov
2013/0187044 A1 7/2013 Ding et al.
2013/0206978 A1 8/2013 Verenchikov et al.
2013/0240725 A1 9/2013 Makarov
2013/0248702 A1 9/2013 Makarov
2013/0256524 A1 10/2013 Brown et al.
2013/0313424 A1 11/2013 Makarov et al.
2013/0327935 A1 12/2013 Wiedenbeck
2014/0005445 A1 1/2014 Komplin et al.
2014/0054454 A1 2/2014 Hoyes et al.
2014/0054456 A1 2/2014 Kinugawa et al.
2014/0084156 A1 3/2014 Ristroph et al.
2014/0117226 A1 5/2014 Giannakopulos
2014/0138538 A1 5/2014 Hieftje et al.
2014/0183354 A1 7/2014 Moon et al.
2014/0191123 A1 7/2014 Wildgoose et al.
2014/0197308 A1* 7/2014 Green ................ H01J 49/0031 250/282
2014/0239172 A1 8/2014 Makarov
2014/0246575 A1 9/2014 Langridge et al.
2014/0291503 A1 10/2014 Shchepunov et al.
2014/0312221 A1 10/2014 Verenchikov et al.
2014/0361162 A1 12/2014 Murray et al.
2015/0028197 A1 1/2015 Grinfeld et al.
2015/0028198 A1 1/2015 Grinfeld et al.
2015/0034814 A1 2/2015 Brown et al.
2015/0048245 A1 2/2015 Vestal et al.
2015/0060656 A1 3/2015 Ugarov

(56) References Cited

U.S. PATENT DOCUMENTS

| | | | | |
|---|---|---|---|---|
| 2015/0122986 | A1 | 5/2015 | Haase | |
| 2015/0144779 | A1 | 5/2015 | Verenchikov | |
| 2015/0194296 | A1* | 7/2015 | Verenchikov ....... | H01J 49/0027 250/282 |
| 2015/0228467 | A1 | 8/2015 | Grinfeld et al. | |
| 2015/0270115 | A1 | 9/2015 | Furuhashi | |
| 2015/0279650 | A1 | 10/2015 | Verenchikov | |
| 2015/0294849 | A1 | 10/2015 | Makarov et al. | |
| 2015/0318156 | A1 | 11/2015 | Loyd et al. | |
| 2015/0364309 | A1 | 12/2015 | Welkie | |
| 2015/0380206 | A1 | 12/2015 | White et al. | |
| 2015/0380233 | A1 | 12/2015 | Verenchikov | |
| 2016/0005587 | A1 | 1/2016 | Verenchikov | |
| 2016/0035552 | A1* | 2/2016 | Verenchikov ....... | H01J 49/0031 250/288 |
| 2016/0035558 | A1 | 2/2016 | Verenchikov et al. | |
| 2016/0079052 | A1 | 3/2016 | Makarov | |
| 2016/0225598 | A1 | 8/2016 | Ristroph | |
| 2016/0225602 | A1 | 8/2016 | Ristroph et al. | |
| 2016/0240363 | A1 | 8/2016 | Verenchikov | |
| 2017/0016863 | A1 | 1/2017 | Verenchikov | |
| 2017/0025265 | A1 | 1/2017 | Verenchikov et al. | |
| 2017/0032952 | A1 | 2/2017 | Verenchikov | |
| 2017/0084443 | A1 | 3/2017 | Willis et al. | |
| 2017/0098533 | A1 | 4/2017 | Stewart et al. | |
| 2017/0168031 | A1 | 6/2017 | Verenchikov | |
| 2017/0229297 | A1 | 8/2017 | Green et al. | |
| 2017/0309459 | A1 | 10/2017 | Tsukamoto et al. | |
| 2017/0338094 | A1 | 11/2017 | Verenchikov et al. | |
| 2018/0144921 | A1 | 5/2018 | Hoyes et al. | |
| 2018/0229297 | A1 | 8/2018 | Funakoshi et al. | |
| 2018/0315589 | A1 | 11/2018 | Oshiro | |
| 2018/0330936 | A1 | 11/2018 | Hoyes et al. | |
| 2018/0366312 | A1 | 12/2018 | Hamish et al. | |
| 2018/0366313 | A1 | 12/2018 | Hoyes et al. | |
| 2019/0019664 | A1 | 1/2019 | Furuhashi et al. | |
| 2019/0180998 | A1 | 6/2019 | Stewart et al. | |
| 2019/0206669 | A1 | 7/2019 | Verenchikov et al. | |
| 2019/0237318 | A1 | 8/2019 | Brown | |
| 2019/0360981 | A1 | 11/2019 | Verenchikov | |
| 2020/0083034 | A1 | 3/2020 | Hoyes et al. | |
| 2020/0090919 | A1 | 3/2020 | Artaev et al. | |
| 2020/0126781 | A1 | 4/2020 | Kovtoun | |
| 2020/0152440 | A1 | 5/2020 | Hoyes et al. | |
| 2020/0168447 | A1 | 5/2020 | Verenchikov | |
| 2020/0168448 | A1 | 5/2020 | Verenchikov et al. | |
| 2020/0243322 | A1 | 7/2020 | Stewart et al. | |
| 2020/0373142 | A1 | 11/2020 | Verenchikov | |
| 2020/0373143 | A1 | 11/2020 | Verenchikov et al. | |
| 2020/0373145 | A1 | 11/2020 | Verenchikov et al. | |
| 2023/0290629 | A1 | 9/2023 | Stewart et al. | |

FOREIGN PATENT DOCUMENTS

| | | | |
|---|---|---|---|
| CN | 101369510 | A | 2/2009 |
| CN | 101523548 | A | 9/2009 |
| CN | 102131563 | A | 7/2011 |
| CN | 201946564 | U | 8/2011 |
| CN | 102884608 | A | 1/2013 |
| CN | 103270574 | A | 8/2013 |
| CN | 104067116 | A | 9/2014 |
| CN | 104508475 | A | 4/2015 |
| CN | 105206500 | A | 12/2015 |
| CN | 106463337 | A | 2/2017 |
| CN | 107636795 | A | 1/2018 |
| CN | 107833823 | A | 3/2018 |
| CN | 107851549 | A | 3/2018 |
| CN | 108292587 | A | 7/2018 |
| DE | 4310106 | C1 | 10/1994 |
| DE | 10116536 | A1 | 10/2002 |
| DE | 102015121830 | A1 | 6/2017 |
| DE | 102019129108 | A1 | 6/2020 |
| DE | 112015001542 | B4 | 7/2020 |
| EP | 0237259 | A2 | 9/1987 |
| EP | 1137044 | A2 | 9/2001 |
| EP | 1566828 | A2 | 8/2005 |
| EP | 1901332 | A1 | 3/2008 |
| EP | 2068346 | A2 | 6/2009 |
| EP | 1665326 | B1 | 4/2010 |
| EP | 1789987 | A4 | 9/2010 |
| EP | 1522087 | B1 | 3/2011 |
| EP | 2599104 | A1 | 6/2013 |
| EP | 1743354 | B1 | 8/2019 |
| EP | 3662501 | A1 | 6/2020 |
| EP | 3662502 | A1 | 6/2020 |
| GB | 2080021 | A | 1/1982 |
| GB | 2217907 | A | 11/1989 |
| GB | 2274197 | A | 7/1994 |
| GB | 2300296 | A | 10/1996 |
| GB | 2390935 | A | 1/2004 |
| GB | 2396742 | A | 6/2004 |
| GB | 2403063 | A | 12/2004 |
| GB | 2455977 | A | 7/2009 |
| GB | 2476964 | A | 7/2011 |
| GB | 2478300 | A | 9/2011 |
| GB | 2484361 | B | 4/2012 |
| GB | 2484429 | B | 4/2012 |
| GB | 2485825 | A | 5/2012 |
| GB | 2489094 | A | 9/2012 |
| GB | 2490571 | A | 11/2012 |
| GB | 2495127 | A | 4/2013 |
| GB | 2495221 | A | 4/2013 |
| GB | 2496991 | A | 5/2013 |
| GB | 2496994 | A | 5/2013 |
| GB | 2500743 | A | 10/2013 |
| GB | 2501332 | A | 10/2013 |
| GB | 2506362 | A | 4/2014 |
| GB | 2528875 | A | 2/2016 |
| GB | 2555609 | A | 5/2018 |
| GB | 2556451 | A | 5/2018 |
| GB | 2556830 | A | 6/2018 |
| GB | 2562990 | A | 12/2018 |
| GB | 2575157 | A | 1/2020 |
| GB | 2575339 | A | 1/2020 |
| GB | 2595530 | A | 12/2021 |
| GB | 2610692 | A | 3/2023 |
| JP | S6229049 | A | 2/1987 |
| JP | 2000036285 | A | 2/2000 |
| JP | 2000048764 | A | 2/2000 |
| JP | 2003031178 | A | 1/2003 |
| JP | 3571546 | B2 | 9/2004 |
| JP | 2005538346 | A | 12/2005 |
| JP | 2006049273 | A | 2/2006 |
| JP | 2007227042 | A | 9/2007 |
| JP | 2010062152 | A | 3/2010 |
| JP | 4649234 | B2 | 3/2011 |
| JP | 2011119279 | A | 6/2011 |
| JP | 4806214 | B2 | 11/2011 |
| JP | 2013539590 | A | 10/2013 |
| JP | 5555582 | B2 | 7/2014 |
| JP | 2015506567 | A | 3/2015 |
| JP | 2015185306 | A | 10/2015 |
| RU | 2564443 | C2 | 5/2017 |
| RU | 2015148627 | A | 5/2017 |
| RU | 2660655 | C2 | 7/2018 |
| SU | 198034 | A1 | 6/1967 |
| SU | 1681340 | A1 | 9/1991 |
| SU | 1725289 | A1 | 4/1992 |
| WO | 199103071 | A1 | 3/1991 |
| WO | 2013063587 | A2 | 4/1992 |
| WO | 2013110587 | A | 4/1992 |
| WO | 2013124207 | A | 4/1992 |
| WO | 1998001218 | A1 | 1/1998 |
| WO | 1998008244 | A2 | 2/1998 |
| WO | 199939369 | A1 | 8/1999 |
| WO | 2005001878 | A2 | 1/2005 |
| WO | 2005043575 | A2 | 5/2005 |
| WO | 2006049623 | A2 | 5/2006 |
| WO | 2006102430 | A2 | 9/2006 |
| WO | 2006103448 | A2 | 10/2006 |
| WO | 2007044696 | A1 | 4/2007 |
| WO | 2007104992 | A2 | 9/2007 |
| WO | 2007136373 | A1 | 11/2007 |

(56) References Cited

FOREIGN PATENT DOCUMENTS

| | | | |
|---|---|---|---|
| WO | 2008046594 | A2 | 4/2008 |
| WO | 2008087389 | A2 | 7/2008 |
| WO | 2010008386 | A1 | 1/2010 |
| WO | 2010034630 | A2 | 4/2010 |
| WO | 2010138781 | A2 | 12/2010 |
| WO | 2011086430 | A1 | 7/2011 |
| WO | 2011107836 | A1 | 9/2011 |
| WO | 2011135477 | A1 | 11/2011 |
| WO | 2012010894 | A1 | 1/2012 |
| WO | 2012013354 | A1 | 2/2012 |
| WO | 2012023031 | A2 | 2/2012 |
| WO | 2012024468 | A2 | 2/2012 |
| WO | 2012024570 | A2 | 2/2012 |
| WO | 2012116765 | A1 | 9/2012 |
| WO | 13045428 | A1 | 4/2013 |
| WO | 2013067366 | A2 | 5/2013 |
| WO | 13093587 | A1 | 6/2013 |
| WO | 2013098612 | A1 | 7/2013 |
| WO | 2013110588 | A2 | 8/2013 |
| WO | 2014021960 | A1 | 2/2014 |
| WO | 2014074822 | A1 | 5/2014 |
| WO | 2014110697 | A | 7/2014 |
| WO | 2014152902 | A2 | 9/2014 |
| WO | 2015142897 | A1 | 9/2015 |
| WO | 2015152968 | A1 | 10/2015 |
| WO | 2015153622 | A1 | 10/2015 |
| WO | 2015153630 | A1 | 10/2015 |
| WO | 2015153644 | A1 | 10/2015 |
| WO | 2015175988 | A1 | 11/2015 |
| WO | 2015189544 | A1 | 12/2015 |
| WO | 2016064398 | A1 | 4/2016 |
| WO | 2016174462 | A1 | 11/2016 |
| WO | 2016178029 | A1 | 11/2016 |
| WO | 2017042665 | A1 | 3/2017 |
| WO | 2017087470 | A1 | 5/2017 |
| WO | 2018073589 | A1 | 4/2018 |
| WO | 2018109920 | A1 | 6/2018 |
| WO | 2018124861 | A2 | 7/2018 |
| WO | 2018183201 | A1 | 10/2018 |
| WO | 2019030474 | A1 | 2/2019 |
| WO | 2019030475 | A1 | 2/2019 |
| WO | 2019030476 | A1 | 2/2019 |
| WO | 2019030477 | A1 | 2/2019 |
| WO | 2019058226 | A1 | 3/2019 |
| WO | 2019162687 | A1 | 8/2019 |
| WO | 2019202338 | A1 | 10/2019 |
| WO | 2019229599 | A1 | 12/2019 |
| WO | 2020002940 | A1 | 1/2020 |
| WO | 2020021255 | A1 | 1/2020 |
| WO | 2020121167 | A1 | 6/2020 |
| WO | 2020121168 | A1 | 6/2020 |
| WO | 2021011415 | A1 | 1/2021 |
| WO | 2023285791 | A1 | 1/2023 |

OTHER PUBLICATIONS

Search Report for GB Application No. GB1903779.5, mailed Sep. 20, 2019.

Search Report for GB Application No. GB2002768.6, mailed Jul. 7, 2020.

Author unknown, "Electrostatic lens ," Wikipedia, Mar. 31, 2017 (Mar. 31, 2017), XP055518392, Retrieved from the Internet: URL: https://en.wikipedia.org/w/index.phptitle=Electrostatic_lens oldid= 773161674 [retrieved on Oct. 24, 2018].

Hussein, O.A et al., "Study the most favorable shapes of electrostatic quadrupole doublet lenses" , AIP Conference Proceedings, vol. 1815, Feb. 17, 2017 (Feb. 17, 2017), p. 110003.

Guan S., et al. "Stacked-ring electrostatic ion guide", Journal of the American Society for Mass Spectrometry, Elsevier Science Inc, 7(1): 101-106 (1996).

Yavor, M.I., et al., "High performance gridless ion mirrors for multi-reflection time-of-flight and electrostatic trap mass analyzers", International Journal of Mass Spectrometry, vol. 426, Mar. 2018, pp. 1-11.

Doroshenko, V.M., and Cotter, R.J., "Ideal velocity focusing in a reflectron time-of-flight mass spectrometer", American Society for Mass Spectrometry, 10(10): 992-999 (1999).

Kozlov, B. et al. "Enhanced Mass Accuracy in Multi-Reflecting TOF MS" www.waters.com/ Posters, ASMS Conference (2017).

Kozlov, B. et al. "Multiplexed Operation of an Orthogonal Multi-Reflecting TOF Instrument to Increase Duty Cycle by Two Orders" ASMS Conference, San Diego, CA, Jun. 6, 2018.

Kozlov, B. et al. "High accuracy self-calibration method for high resolution mass spectra" ASMS Conference Abstract, 2019.

Kozlov, B. et al. "Fast lon Mobility Spectrometry and High Resolution TOF MS" ASMS Conference Poster (2014).

Verenchicov, A. N. "Parallel MS-MS Analysis in a Time-Flight Tandem. Problem Statement, Method, and Instrucmental Schemes" Institute for Analytical Instrucmentation RAS, Saint-Petersburg, (2004) ABSTRACT.

Yavor, M. I. "Planar Multireflection Time-Of-Flight Mass Analyser with Unlimited Mass Range" Institute for Analytical Instrucmentation RAS, Saint-Petersburg, (2004) ABSTRACT.

Khasin, Y. I et al. "Initial Experimenatl Studies of a Planar Multireflection Time-Of-Flight Mass Spectrometer" Institute for Analytical Instrucmentation RAS, Saint-Petersburg, (2004) ABSTRACT.

Verenchicov, A. N et al. "Stability of lon Motion in Periodic Electrostatic Fields" Institute for Analytical Instrumentation RAS, Saint-Petersburg, (2004) ABSTRACT.

Verenchicov, A. N. "The Concept of Multireflecting Mass Spectrometer for Continuous lon Sources" Institute for Analytical Instrucmentation RAS, Saint-Petersburg, (2006) ABSTRACT.

Verenchicov, A. N., et al. "Accurate Mass Measurements for Inerpreting Spectra of atmospheric Pressure Ionization" Institute for Analytical Instrucmentation RAS, Saint-Petersburg, (2006) ABSTRACT.

Kozlov, B. N. et al., "Experimental Studies of Space Charge Effects in Multireflecting Time-Of-Flight Mass Spectrometes" Institute for Analytical Instrucmentation RAS, Saint-Petersburg, (2006) ABSTRACT.

Kozlov, B. N. et al., "Multireflecting Time-Of-Flight Mass Spectrometer With an lon Trap Source" Institute for Analytical Instrucmentation RAS, Saint-Petersburg, (2006) ABSTRACT.

Hasin, Y. I., et al., "Planar Time-Of-Flight Multireflecting Mass Spectrometer with an Orthogonal lon Injection Out of Continuous lon Sources" Institute for Analytical Instrucmentation RAS, Saint-Petersburg, (2006) ABSTRACT.

Lutvinsky Y. I. et al., "Estimation of Capacity of High Resolution Mass Spectra for Analysis of Complex Mixtures" Institute for Analytical Instrucmentation RAS, Saint-Petersburg, (2006) ABSTRACT.

Verenchicov, A. N. et al. "Multiplexing in Multi-Reflecting TOF MS" Journal of Applied Solution Chemistry and Modeling, 6:1-22 (2017).

Reflectron—Wikipedia, Oct. 9, 2015, Retrieved from the Internet: URL:https://en.wikipedia.org/w/index. phptitle=Reflectron oldid= 684843442 [retrieved on May 29, 2019].

Scherer, S., et al., "A novel principle for an ion mirror design in time-of-flight mass spectrometry", International Journal of Mass Spectrometry, Elsevier Science Publishers, Amsterdam, NL, vol. 251, No. 1, Mar. 15, 2006.

Sakurai et al., "A New Multi-Passage Time-of-Flight Mass Spectrometer at JAIST", Nuclear Instruments and Methods in Physics Research, Section A, Elsevier, 427(1-2): 182-186, May 11, 1999. ABSTRACT.

Toyoda et al., "Multi-Turn-Time-of-Flight Mass Spectometers with Electrostatic Sectors", Journal of Mass Spectrometry, 38: 1125-1142, Jan. 1, 2003.

Wouters et al., "Optical Design of the TOFI (Time-of-Flight Isochronous) Spectrometer for Mass Measurements of Exotic Nuclei", Nuclear Instruments and Methods in Physics Research, Section A, 240(1): 77-90, Oct. 1, 1985.

Stresau, D., et al. "lon Counting Beyond 10ghz Using a New Detector and Conventional Electronics", European Winter Conference on Plasma Spectrochemistry, Feb. 4-8, 2001, Lillehammer, Norway, Retrieved from the Internet: URL: https://www.etp-ms.com/file-repository/21 [retrieved on Jul. 31, 2019].

Kaufmann, R., et al., "Sequencing of peptides in a time-of-flight mass spectrometer: evaluation of postsource decay following matrix-assisted laser desorption ionisation (Maldi)", International Journal

(56) References Cited

OTHER PUBLICATIONS of Mass Spectrometry and Ion Processes, Elsevier Scientific Publishing Co. Amsterdam, NL, 31:355-385, Feb. 24, 1994.
Barry Shaulis et al.: "Signal linearity of an extended range pulse counting detector: Applications to accurate and precise U-Pb dating of zircon by laser ablation quadrupole ICP-MS", G3: Geochemistry, Geophysics, Geosystems, 11(11): 1-12, Nov. 20, 2010.
Author unknown, "Einzel Lens", Wikipedia [online] Nov. 2020 [retrieved on Nov. 3, 2020]. Retrieved from Internet URL: https://en.wikipedia.org/wiki/Einzel_lens, 2 pages.
Carey, D.C., "Why a second-order magnetic optical achromat works", Nucl. Instrum. Meth., 189(203): 365-367 (1981). ABSTRACT.
Sakurai, T. et al., "lon optics for time-of-flight mass spectrometers with multiple symmetry", Int J Mass Spectrom lon Proc 63(2-3):273-287 (1985). ABSTRACT.
Wollnik, H., and Casares, A., "An energy-isochronous multi-pass time-of-flight mass spectrometer consisting of two coaxial electrostatic mirrors", Int J Mass Spectrom 227:217-222 (2003). ABSTRACT.
O'Halloran, G.J., et al., "Determination of Chemical Species Prevalent in a Plasma Jet", Bendix Corp Report Asd- TDR-62-644, U.S. Air Force (1964). ABSTRACT.
Collision Frequency, https://en.wikipedia.org/wiki/Collision_frequency accessed Aug. 17, 2021.
Hoyes et al., "Electrostatic gimbal for correction of errors in Time of Flight mass spectrometers", Waters, 2013.
Verentchikov et al., "Stable ion beam transport through periodic electrostatic structures: linear and non-linear effects", Physics Procedia vol. 1, No. 1, pp. 87-97, Aug. 2008.
Search Report for United Kingdom Patent Application No. GB2110152.2, mailed Apr. 14, 2022.
Artaev, V., "High resolution multi-reflecting time-of-flight mass analyzer with folded flight path HR MR-TOFMS Ffp", pp. 1-19, LECO Corporation, httQS:/ /theanalyticalscientist.com/fileadmin/tas/app-notes/2021/ Leco_FOLDED_FLIGHT_PATH_FFP_WHITE_PAPER 209-281-008. pdf (2021).
Verenchikov, A., et al., "Multiplexing in Multi-Reflecting TOF MS", Journal of Applied Solution Chemistry and Modeling, 6:1-22, (2017).
Willis, P., et al., "Improving duty cycle in the Folded Flight Path high-resolution time-of-flight mass spectrometer", International Journal of Mass Spectrometry, vol. 459, 116467, Nov. 1, 2020.

* cited by examiner

MULTIPLEXED TIME OF FLIGHT MASS SPECTROMETER

CROSS-REFERENCE TO RELATED APPLICATIONS

This application is a U.S. national phase filing claiming the benefit of and priority to International Patent Application No. PCT/GB2020/050471, filed Feb. 27, 2020, which claims priority from and the benefit of United Kingdom patent application No. 1903779.5 filed on Mar. 20, 2019. The entire contents of these applications are incorporated herein by reference.

FIELD OF THE INVENTION

The present invention relates generally to time of flight (ToF) mass spectrometry in which ions are pushed into the ToF mass analyser at a relatively high rate, resulting in a multiplexed ion signal.

BACKGROUND

It is often desirable to separate ions and then analyse them using a ToF mass analyser. For example, ions may be separated by an ion mobility separator (IMS) and analysed by a ToF mass analyser. Historically, typical ToF mass analysers require separation timescales of the order of around 20 μs to 200 μs for mass ranges up to a few thousand, dependent on the ToF mass analyser geometry. In contrast, typical faster IMS peak widths are of the order 0.4 ms to 1 ms, depending on the IMS geometry. The two separation timescales for these devices are therefore well matched, as the ToF separation time scale is significantly shorter than the IMS separation time scale, and hence multiple ToF mass spectra can be individually acquired across the IMS peak. This allows, for example, two dimensional nested data sets to be produced, wherein one dimension is the ToF mass and the other dimension is the IMS separation time.

The advent of ToF mass analysers which have a relatively long flight path has enabled ions to be analysed with a relatively high mass resolution. However, as the ions have a relatively long flight time through such mass analysers, this reduces the rate at which ions can be pushed into the ToF mass analyser without the spectral data for ions from different pushes temporally overlapping. There is therefore difficulty in using such high resolution ToF mass analysis techniques with relatively fast upstream ion separation techniques such as IMS devices or mass filters having a mass transmission window that is scanned at a relatively high rate.

SUMMARY

The present invention provides a method of time of flight (ToF) mass spectrometry comprising: pushing ions into a ToF mass analyser in a plurality of pushes, wherein the time spacing between adjacent pushes is shorter than either the longest flight time, or the range of flight times, of the ions in the ToF mass analyser from any given one of the pushes; detecting the ions with a ToF detector so as to obtain spectral data; decoding the spectral data to determine first mass spectral data relating to ions pushed into the ToF mass analyser by a first plurality of the pushes, and allocating this first mass spectral data to a first time stamp; and decoding the spectral data to determine second mass spectral data relating to ions pushed into the ToF mass analyser by a second plurality of the pushes, and allocating this second mass spectral data to a second time-stamp; wherein the first and second time-stamps have a time difference therebetween that is shorter than said longest flight time, or said range of flight times, in the ToF mass analyser.

Conventionally, ToF mass analysers in which ions have relatively long flight times only sample ions at a relatively low rate so as to avoid ions from different ToF pushes overlapping in time at the detector and causing spectral confusion.

As the method of the present invention produces time stamps having a time difference which is shorter than the longest flight time (or said range of flight times) in the ToF mass analyser, the method is able to intermittently record the mass spectral data at a relatively high rate, even if the longest flight time (or range of flight times) in the ToF mass analyser is relatively long. This allows a relatively high mass resolution ToF mass analyser to be used to sample the ions, whilst profiling a relatively quickly changing ion signal. For example, if ions are separated according to ion mobility or mass to charge ratio upstream of the ToF mass analyser, a relatively short ion peak eluting from the separator may be sampled multiple times by the ToF mass analyser (i.e. multiple timestamps for each peak), even if the longest flight time (or said range of flight times) in the ToF mass analyser is longer than the peak width. Similarly, the technique may be used to sample ions whilst an operational parameter of the spectrometer is being varied with time.

For the avoidance of doubt, said range of flight times is defined as the duration given by subtracting the shortest flight time from the longest flight time.

It is believed that techniques which ultimately produce mass spectral data at a time spacing that is shorter than the longest flight time in the ToF mass analyser are not known.

It is known to push ions into a ToF mass analyser at a relatively high rate using an Encoded Frequency Pulsing (EFP) technique and then decode the resulting signal at the detector using knowledge of the pulse timings. However, such techniques decode the spectral data so as to provide separate mass spectral data for each ToF push. They effectively consider that there are multiple parallel ToF analyses (i.e. one for each push) that are offset in time from each other and ensure that the data from the parallel analyses never mix. Furthermore, problems would be encountered if such EFP techniques were used to profile ions eluting from an upstream ion separator. For example, in order to obtain mass spectral data for any given time point in the upstream separation it is necessary to deconvolve the EFP data. However, deconvolving the data would involve using mass spectral data obtained from ions pushed before and/or after the upstream ion separation time point. As such, the deconvolved data would be temporally blurred and would not accurately reflect how the flux of ions arriving at the detector varies with the upstream ion separation.

In contrast to conventional techniques, in embodiments of the present invention, mixed data from multiple pushes is decoded to produce mass spectral data at a period shorter than the longest flight time in the ToF mass analyser. This allows the data to be kept in the correct time sequence.

The method may comprise performing the first plurality of the pushes before the second plurality of the pushes.

The first plurality of the pushes may be a separate, non-overlapping set of pushes to the second plurality of the pushes.

Said allocating the first mass spectral data to the first time stamp may comprise summing the first mass spectral data and associating it with the first time stamp; and said allocating the second mass spectral data to the second time stamp may comprise summing the second mass spectral data and associating it with the second time stamp.

The method may comprise separating ions according to their ion mobility and/or mass to charge ratio in one or more ion separator and transmitting the separated ions, or ions derived therefrom, to the ToF mass analyser whilst performing said plurality of pushes.

The step of separating ions may comprise separating the ions using a drift time ion mobility separator. Alternatively, or additionally, the step of separating ions may comprise passing the ions through a mass filter having a mass transmission window that is varied with time. Alternatively, or additionally, the step of separating ions may comprise mass selectively ejecting ions from an ion trap towards the ToF mass analyser, wherein the mass or range of masses ejected from the ion trap varies with time.

However, it is contemplated that the ions may alternatively be separated according to a physicochemical property other than ion mobility and/or mass to charge ratio.

It is also contemplated that molecular analyte may be separated according to a physicochemical property by a separator and the eluting analyte ionised to form ions, wherein these ions, or ions derived therefrom, are transmitted to the ToF mass analyser whilst performing said plurality of pushes.

Ions elute from the separator over time as one or more ion peak, and the first and second time-stamps may have a time difference therebetween that is shorter than the width of each of the one or more ion peaks.

For example, the time difference may be shorter than the FWHM of the ion peak.

The ion separator may performs a plurality of ion separation cycles and ions from the ion separator, or ions derived therefrom, may be pushed into the ToF mass analyser a plurality of times during each cycle.

The method may comprise fragmenting or reacting ions from the separation device to produce fragment or product ions, and pushing the fragment or product ions into the ToF mass analyser.

The method may comprise varying an operational parameter of a spectrometer that performs said method such that the ion signal at the detector varies with time, and performing said step of pushing ions into the ToF mass analyser in a plurality of pushes whilst varying said operational parameter.

This allows the ToF mass analyser to profile the response of the ions to the variation of the operational parameter.

The method may comprise transmitting ions in a CID fragmentation device and pushing ions from the fragmentation device, or ions derived therefrom, into the ToF mass analyser in said plurality of pushes; wherein the operational parameter is the collision energy with which ions are subjected to in the fragmentation device.

The method may comprise providing two dimensional nested data sets, wherein one dimension is the mass to charge ratio determined by the ToF mass analyser and the other dimension is either: the separation time from the separator, or the value of the operational parameter.

Ions from any given ToF push may arrive at the ToF detector over a time period during which ions from other ToF pushes also arrive at the ToF detector.

The method may comprise varying the temporal spacing between adjacent ToF pushes for different pairs of adjacent pushes in a known manner; and using the known variation of the temporal spacing between adjacent ToF pushes in said decoding of the spectral data to determine the first and second mass spectral data.

The step of decoding the spectral data to determine the first mass spectral data may comprise decoding spectral data obtained by the detector in a first decoding time range, wherein all of the ions that reach the detector in the first decoding time range come from a first set of ToF pushes, wherein every possible pair of ToF pushes in said first set that are separated from each other by a temporal spacing that is less than said longest flight time, or within said range of flight times, has a unique temporal spacing therebetween. Alternatively, or additionally, said step of decoding the spectral data to determine the second mass spectral data comprises decoding spectral data obtained by the detector in a second decoding time range, wherein all of the ions that reach the detector in the second decoding time range come from a second set of ToF pushes, wherein every possible pair of ToF pushes in said second set that are separated from each other by a temporal spacing that is less than said longest flight time, or within said range of flight times, has a unique temporal spacing therebetween.

Optionally, every possible pair of ToF pushes in said first set has a unique temporal spacing therebetween and/or every possible pair of ToF pushes in said second set has a unique temporal spacing therebetween.

The pushes that occur at least in the duration corresponding to the first plurality of pushes plus said longest flight time, or said range of flight times, may have unique temporal spacings therebetween.

The pattern with which the temporal spacings in this duration vary may be repeated for pushes that occur from the end of this duration.

By unique temporal spacings it is meant that the variation in the temporal spacing between ToF pushes is arranged so that the temporal spacing between any given pair of pushes is not the same as the temporal spacing between any other pair of pushes.

The temporal spacings between pairs of pushes may be further restricted so that the temporal spacing between any given pair of pushes differs from the temporal spacing between any other pair of pushes by more than a predetermined about. The predetermined amount may be, or be based on, a temporal characteristic of the spectrometer, e.g. such as an ADC or TDC sampling period, the detector peak widths or ion arrival time distributions defined by the resolution of the ToF mass analyser. This variation in the pusher spacings may improve the ability to decode the data as it reduces the likelihood of different m/z ions being repeatedly coincident at the ToF detector.

The first decoding time range may correspond to the duration of time defined by the first plurality of pushes plus either said longest flight time, or said range of flight times, of the ions in the ToF mass analyser for any given one of the pushes; and/or the second decoding time range may correspond to the duration of time defined by the second plurality of pushes plus either said longest flight time, or said range of flight times, of the ions in the ToF mass analyser for any given one of the pushes.

The step of decoding the spectral data to determine first mass spectral data may comprise summing the spectral data obtained over the first decoding time range with one or more time shifted version of itself and determining which spectral data in the summed data is coherent; and optionally wherein substantially only the coherent data is assigned to the first time stamp. Alternatively, or additionally, the step of decoding the spectral data to determine second mass spectral data may comprise summing the spectral data obtained over the second decoding time range with one or more time shifted version of itself and determining which spectral data in the summed data is coherent; and optionally wherein substantially only the coherent data is assigned to the second time stamp Each of the first and/or second plurality of pushes may be a number of pushes selected from: ≥3; ≥4; ≥5; ≥6; ≥7; ≥8; ≥9; or ≥10.

The number of pushes in the first plurality of pushes may be the same as the number of pushes in the second plurality of pushes.

Where n sets of spectral data are obtained, all of the n plurality of pushes may consist of the same number of pushes.

The method may comprise decoding the spectral data to determine third mass spectral data relating to ions pushed into the ToF mass analyser by a third plurality of the pushes, and allocating this third mass spectral data to a third time stamp; wherein the second and third time-stamps have a time difference therebetween that is shorter than said longest flight time, or the range of flight times, in the ToF mass analyser.

Although first, second and third mass spectral data have been described above, the method may determine n sets of spectral data, wherein each nth set of spectral data relates to ions pushed into the ToF mass analyser by a respective nth plurality of the pushes, wherein the nth mass spectral data is allocated to an nth time stamp; and wherein the nth and (n−1)th time-stamps have a time difference therebetween that is shorter than said longest flight time, or the range of flight times, in the ToF mass analyser. The integer n may be ≥4; ≥5; ≥6; ≥7; ≥8; ≥9; or ≥10 The method may comprise decoding the spectral data to determine third mass spectral data relating to ions pushed into the ToF mass analyser by a third plurality of the pushes, and allocating this third mass spectral data to a third time stamp; wherein the second and third time-stamps have a time difference therebetween that is shorter than said longest flight time, or the range of flight times, in the ToF mass analyser; wherein the mean time of the first plurality of pushes is separated by the mean time of the second plurality of pushes by a first duration, and the mean time of the second plurality of pushes is separated from the mean time of a third plurality of pushes by substantially the same first duration.

Similarly, where n sets of spectral data are obtained, the mean time of the nth plurality of pushes may be separated by the mean time of the (n+1)th plurality of pushes by the first duration. This is advantageous as it results in all of the timestamps being equally spaced.

The ToF mass analyser may be a multi-reflecting time of flight mass analyser.

In such an instrument, ions are pushed into the ToF flight region and are reflected between ion mirrors multiple times before the impact on the ToF detector.

The method may comprise using the first mass spectral data at the first time-stamp and/or the time of the first time stamp to identify the ions pushed into the ToF mass analyser in the first plurality of pushes, or to identify ions from which they are derived/Alternatively, or additionally, the method may comprise using the second mass spectral data at the second time-stamp and/or the time of the second time stamp to identify the ions pushed into the ToF mass analyser in the second plurality of pushes, or to identify ions from which they are derived.

For example, if the ions are separated by an ion mobility separator upstream of the ToF mass analyser, then the time of each time-stamp is indicative of the ion mobility of the ions analysed in the respective plurality of pushes associated with that time-stamp. This may be used, optionally together with the mass spectral data for those ions, to identify those ions or ions from which they are derived.

Similarly, in the embodiments in which an operational parameter of the spectrometer is varied, then the time of each time-stamp is indicative of the value of the operational parameter that the ions are subjected to during the respective plurality of pushes associated with that time-stamp. This may be used, optionally together with the mass spectral data for those ions, to identify those ions or ions from which they are derived.

The method may further comprise controlling a computer display or other device based on, e.g. indicate, the identities of the ions.

The present invention also provides a ToF mass spectrometer comprising: a ToF mass analyser having a pusher configured to push ions into the ToF mass analyser in a plurality of pushes, wherein the time spacing between adjacent pushes is shorter than either the longest flight time, or the range of flight times, of the ions in the ToF mass analyser from any given one of the pushes; an ion detector for detecting the ions so as to obtain spectral data; one or more processor configured to decode the spectral data to determine first mass spectral data relating to ions pushed into the ToF mass analyser by a first plurality of the pushes and to store the first mass spectral data associated with a first time-stamp in a memory; and one or more processor configured to decode the spectral data to determine second mass spectral data relating to ions pushed into the ToF mass analyser by a second plurality of the pushes and to store the second mass spectral data associated with a second time-stamp in a memory; wherein the first and second time-stamps have a time difference therebetween that is shorter than said longest flight time, or said range of flight times, in the ToF mass analyser.

The mass spectrometer may be arranged and configured to perform any of the methods described herein.

The sampling rate of long flight time ToF mass analysers are not well suited to profiling peaks produced by fast separators such as ion mobility separators or scanning quadrupoles. Embodiments relate to methods of encoding the pusher pulse so as to result in multiplexed spectra. The multiplexed spectra are decoded in a way that produces ToF mass spectra at a time period (or spacing) that is significantly shorter than the flight time (or range of flight times) of the analysed ions so that the ToF mass spectra profile peaks produced by the fast separator. Separators such as ion mobility separators or scanning quadrupoles, where the eluting peak widths are narrower in time than the ToF flight times (or range of flight times) of ions are of particular interest.

BRIEF DESCRIPTION OF THE DRAWINGS

Various embodiments will now be described, by way of example only, and with reference to the accompanying drawings in which.

DETAILED DESCRIPTION

It is often desirable to separate ions and then analyse them using a Time of Flight (ToF) mass analyser. For example, ions may be separated by an ion mobility separator (IMS) and analysed by a ToF mass analyser. Historically, typical ToF mass analysers require separation timescales of the order of around 20 μs to 200 μs for mass ranges up to a few thousand, dependent on the ToF mass analyser geometry. In contrast, typical faster IMS peak widths are of the order 0.4 ms to 1 ms, depending on the IMS geometry. The two separation timescales for these devices are therefore well matched, as the ToF separation time scale is significantly shorter than the IMS separation time scale, and hence multiple ToF mass spectra can be individually acquired across the IMS peak. This allows, for example, two dimensional nested data sets to be produced, wherein one dimension is the ToF mass and the other dimension is the IMS separation time.

The advent of ToF mass analysers which have a relatively long flight path has enabled ions to be analysed with a relatively high mass resolution. However, as the ions have a relatively long flight time through such mass analysers, this reduces the rate at which ions can be pulsed into the ToF mass analyser. There is therefore difficulty in using such high resolution ToF mass analysis techniques with relatively fast upstream ion separation techniques such as IMS devices or mass filters having a mass transmission window that is scanned at a relatively high rate.

Figure 1:
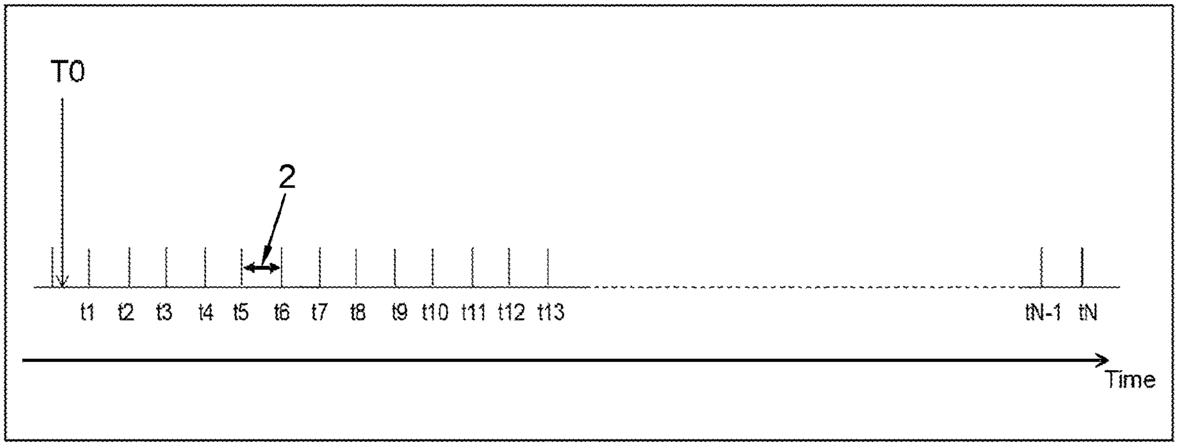
FIG. 1 illustrates the timings at which ions are pushed into a ToF mass analyser for mass analysis during a conventional IMS-ToF experiment.
Figure 2:
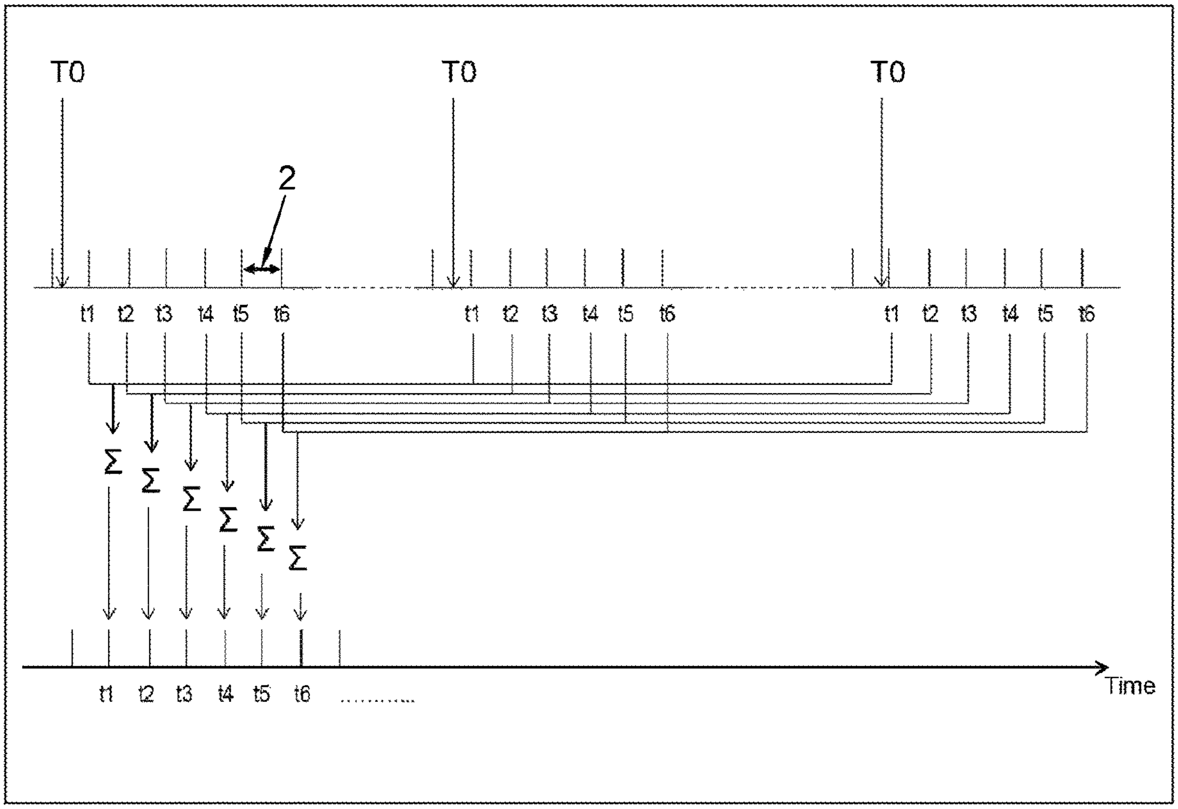
FIG. 2 illustrates how multiple sequential IMS-ToF mass spectrometry experiments, each of the type described in relation to FIG. 1, may be combined to produce a nested two dimensional (2D) data set.

In conventional approaches individual ToF mass spectra are given an individual timestamps as shown in FIG. 1 and FIG. 2.

FIG. 1 illustrates the timings at which ions are pushed into a ToF mass analyser for mass analysis during an IMS experiment. Ions may be pulsed into an IMS device at time T0 such that they separated according to their ion mobility in the IMS device and elute therefrom. The ions elute and travel into a ToF mass analyser. The pusher of the ToF mass analyser receives the ion beam eluting from the IMS and is pulsed a plurality of times so as to sample the ion beam a corresponding plurality of times. The ions pushed into the ToF mass analyser are mass analysed therein. As shown in FIG. 1, the first push of the ToF pusher (after time T0) is assigned a time t1, the second push of the ToF pusher is assigned a time t2, the third push of the ToF pusher is assigned a time t3, etc. In other words, the nth push of the ToF pusher is assigned a time tn. The duration of time between adjacent pushes is the pusher period and this may be set such that the flight time 2 of the slowest ions through the ToF mass analyser is shorter than the pusher period. Mass spectral data obtained from the nth push may be associated with a corresponding push time tn. The start time T0 and pusher time t1 may be synchronized or asynchronous and the time difference between T0 and t1 may be known, measured or unknown.

In the example shown, N ToF pushes are used to sample the IMS separation, thus giving an IMS separation time at least equal to N multiplied by the pusher period. However, in practice the overall cycle time may be greater than this due to time delays or offsets elsewhere in the ion path.

FIG. 2 illustrates how multiple sequential IMS-ToF mass spectrometry experiments, each of the type described in relation to FIG. 1, may be combined to produce a nested two dimensional (2D) data set. In this example, three IMS experiments (i.e. separations) are shown, each having its own start time T0. Data obtained from the first ToF pushes t1 which occur after the IMS experiments start are summed together and assigned the same time t1, as shown in the lower part of FIG. 2. As previously stated, the time difference between T0 and t1 (for each IMS experiment) may be synchronized or asynchronous and may be known, measured or unknown. Data obtained from the second ToF pushes t2 which occur after the IMS experiments start are summed together and assigned the same time t2. Data obtained from the third ToF pushes t3 are summed together and assigned the same time t3. In other words, data obtained from the nth ToF pushes which occur after the IMS experiments start are summed together and assigned the same time tn. In the illustrated example n is 6, although other integer numbers may be used.

Figure 3:
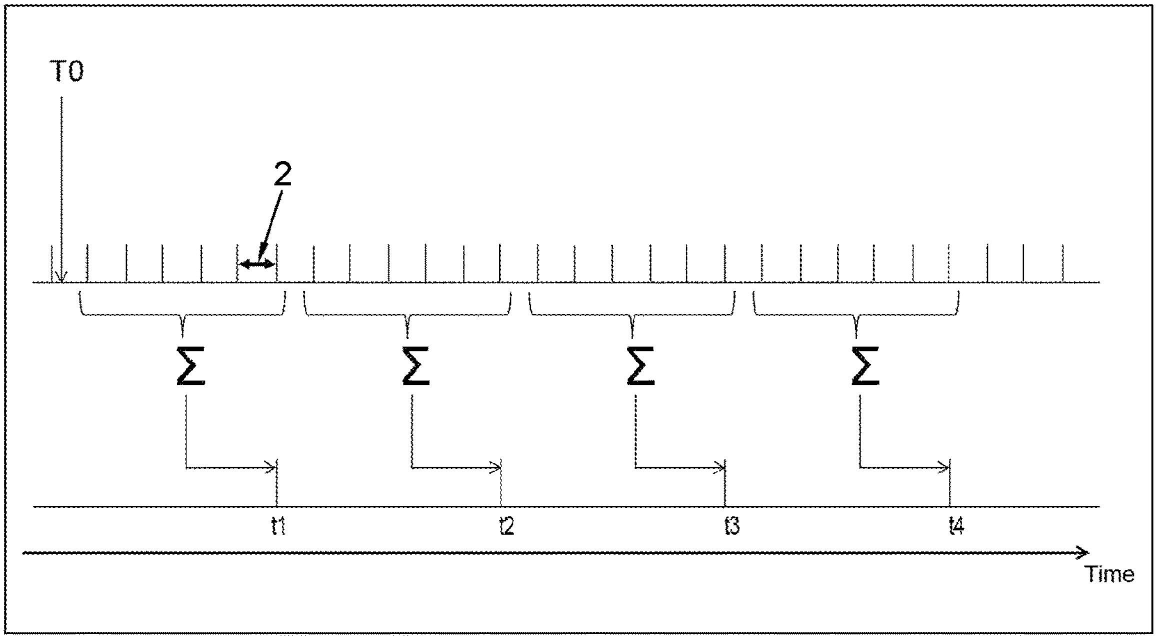
FIG. 3 illustrates an IMS-ToF mass spectrometry experiment of the type described in relation to FIG. 1, except wherein the data obtained from sequential ToF pushes are combined.

FIG. 3 illustrates an IMS-ToF mass spectrometry experiment of the type described in relation to FIG. 1, except wherein the data obtained from a first series of sequential ToF pushes (e.g. <50 pushes) are combined to produce summed spectra which are given an individual timestamp t1. Data from a second series of sequential ToF pushes are also combined to produce summed spectra which are given an individual timestamp t2. Data from a third series of sequential ToF pushes are combined to produce summed spectra which are given an individual timestamp t3. Data from a fourth series of sequential ToF pushes are combined to produce summed spectra which are given an individual timestamp t4. Although four series of sequential ToF pushes are shown as being summed, fewer or greater numbers may be used. This technique enables the duration between adjacent timestamps (tn) to be relatively large, i.e. larger than the ToF pusher duration. The ToF mass analyser acquisition sampling rate is therefore effectively slowed down such that the ToF mass analyser may be suited to analysing ions that are separated upstream by a relatively slow separation process (e.g. slower than IMS), for example, by a separation process performed by scanning a quadrupole mass filter, by m/z selective ejection from an ion trap, by a differential mobility analyser, or by a wide range of other scanning approaches such as scanned collision energy. The approach shown in FIG. 3 is particularly useful for scenarios where the ToF mass analyser acquisition architecture has a limited total number of time stamps, tN, or time bins.

An important aspect of the approaches shown in FIGS. 1, 2 and 3 is that the pusher period between adjacent ToF pushes is longer than the maximum time of flight 2 through the ToF mass analyser (for the ions pushed into the ToF mass analyser) in any given push. This restriction allows spectra from different ToF pushes to be simply combined as described above, thus proving a two dimensional data set.

However, the drive towards higher ToF mass resolution and improved m/z accuracy has inevitably led to an increase in the separation timescales of ToF mass analysers, i.e. longer ion flight times. In some instances the ToF separations can take multiple milliseconds for the m/z ranges that are of interest. In such cases the timescale of the ToF mass separation may not be well matched to the timescale of the upstream ion separation, and so the separated ions cannot be sampled by the downstream ToF mass analyser at a sufficiently high rate. It is therefore desirable to provide a technique by which a ToF mass analyser having a relatively long ion flight path (i.e. ion flight time) can produce ToF mass spectra at a relatively high period that is compatible with a relatively fast upstream ion separator, and therefore at a period that is significantly shorter than the ToF mass separation timescale for the m/z ranges that are analysed in a given ToF push. This may be achieved by the following embodiments of the present invention.

Figure 4:
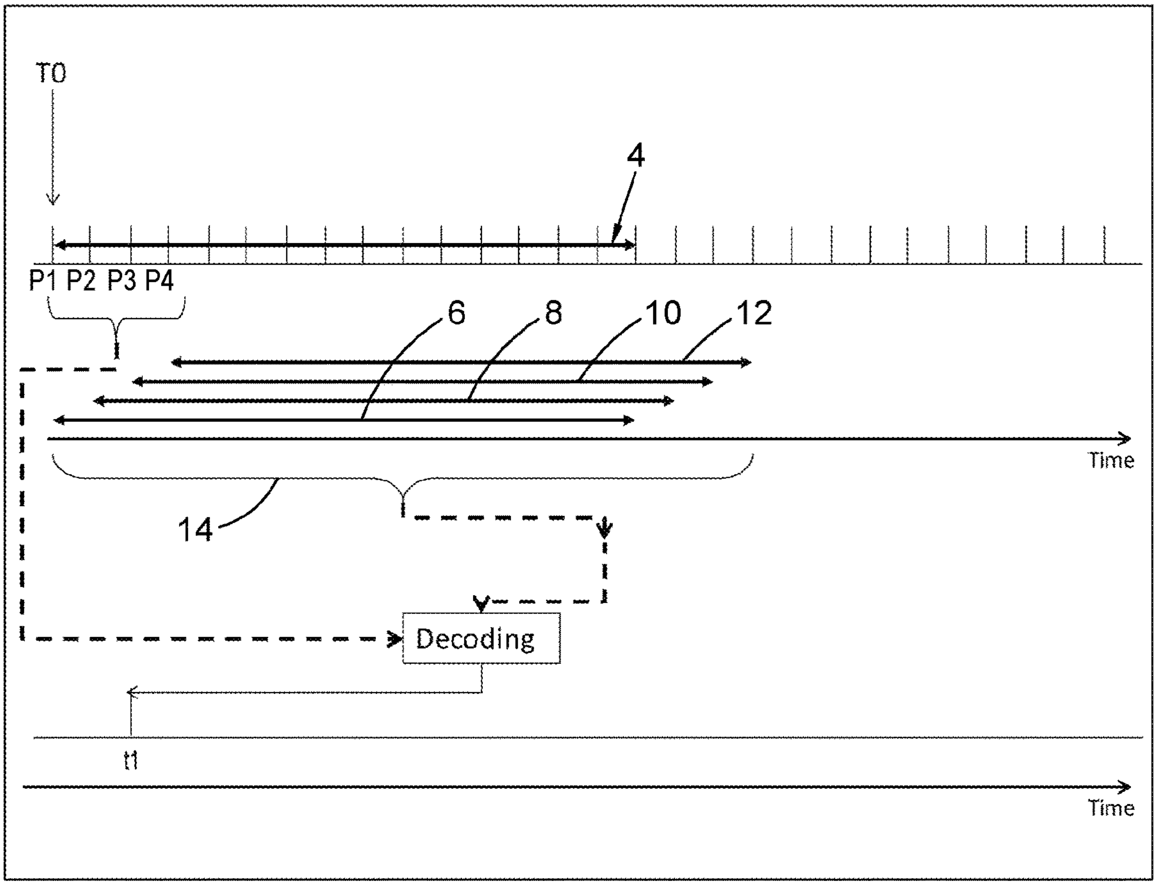
FIG. 4 illustrates the timings at which ions are pushed into a ToF mass analyser for mass analysis during an IMS experiment, according to an embodiment of the invention.

FIG. 4 illustrates the timings at which ions are pushed into a ToF mass analyser for mass analysis during an IMS experiment, according to an embodiment of the invention. Ions may be pulsed into an IMS device at time T0 such that they are separated and elute from the IMS device at times according to their ion mobility. The ions elute and travel into a ToF mass analyser. The pusher of the ToF mass analyser receives the ion beam eluting from the IMS device and is pulsed a plurality of times so as to sample the ion beam a corresponding plurality of times. The ions pushed into the ToF mass analyser are mass analysed therein. As shown in FIG. 4, the ToF pusher is pulsed a plurality of times. The first push of the ToF pusher that is at, or after, time T0 is labelled P1, the second subsequent push of the ToF pusher is labelled P2, the third push of the ToF pusher is labelled P3, and the fourth push of the ToF pusher is labelled P4. The subsequent ToF pushes are not labelled in FIG. 4 but are denoted by vertical lines that are spaced along the horizontal axis. The start time T0 and pusher time t1 may be synchronized or asynchronous and the time difference between T0 and t1 may be known, measured or unknown.

In the embodiment of FIG. 4, the duration of time between each pair of adjacent ToF pushes is set to be significantly shorter than the maximum time of flight of ions analysed in the ToF mass analyser (from the first of those ToF pushes), or to be shorter than the time spread 4 of the range of times of flight (for ions analysed from the first of those ToF pushes). This is illustrated in FIG. 4, wherein arrow 6 represents the time range over which different ions pulsed into the ToF mass analyser by push P1 may be received at the ToF detector, due to their range of mass to charge ratios. This is therefore also the time range over which the ToF detector response may relate to ions from the first ToF push P1. Similarly, arrow 8 illustrates the time range over which the ToF detector response may relate to ions from the second ToF push P2. Arrow 10 illustrates the time range over which the ToF detector response may relate to ions from the third ToF push P3. Arrow 12 illustrates the time range over which the ToF detector response may relate to ions from the fourth ToF push P4. In this embodiment it is assumed that the mass range analysed in each of the different ToF pushes is substantially the same. However, it is contemplated that mass range analysed may vary between ToF pushes and that the time range over which the ToF detector response relates to ions from a given push may vary.

This approach results in mixed or multiplexed ToF mass spectral data, i.e. ions from any given TOF push arrive at the ToF detector over a time period during which ions from other ToF pushes also arrive at the ToF detector. This can be seen from FIG. 4, wherein the time periods 6-12 over which ions arrive at the ToF detector from ToF pushes P1-P4 all overlap with each other for part of their respective time periods. At certain times the detector response may therefore correspond to ion arrivals that might originate from any one of the four pushes P1-P4 (or pushes earlier than P1 or later than P4).

Importantly, the temporal spacing between adjacent ToF pushes is not constant. Rather, the temporal spacing varies such that the duration of time between adjacent pushes varies for different pairs of adjacent pushes, in a known (e.g. predetermined) manner. As will be described further below, the knowledge of how the temporal spacing between adjacent ToF pushes varies is then used to decode or demultiplex the ToF detector responses during the time range 14 over which it receives ions from the first to fourth pushes P1-P4. The resultant decoded spectral data obtained during detector response period 14 (i.e. from pushes P1-P4) is associated with a time stamp t1.

As will be described further below, the variation in the temporal spacing between adjacent ToF pushes may be arranged so that the temporal spacing between any given pair of pushes is not the same as the temporal spacing between any other pair of pushes, i.e. each pair of pushes are separated by a unique temporal spacing. In practice, the temporal spacings between pairs of pushes may be further restricted so that any given pair of pushes differs from the temporal spacing between any other pair of pushes by more than a temporal characteristic of the spectrometer, e.g. by more than an ADC or TDC sampling period, the detector peak widths or ion arrival time distributions defined by the resolution of the ToF mass analyser. This variation in the pusher spacings may improve the ability to decode the data as it reduces the likelihood of different m/z ions being repeatedly coincident at the ToF detector.

Figure 5:
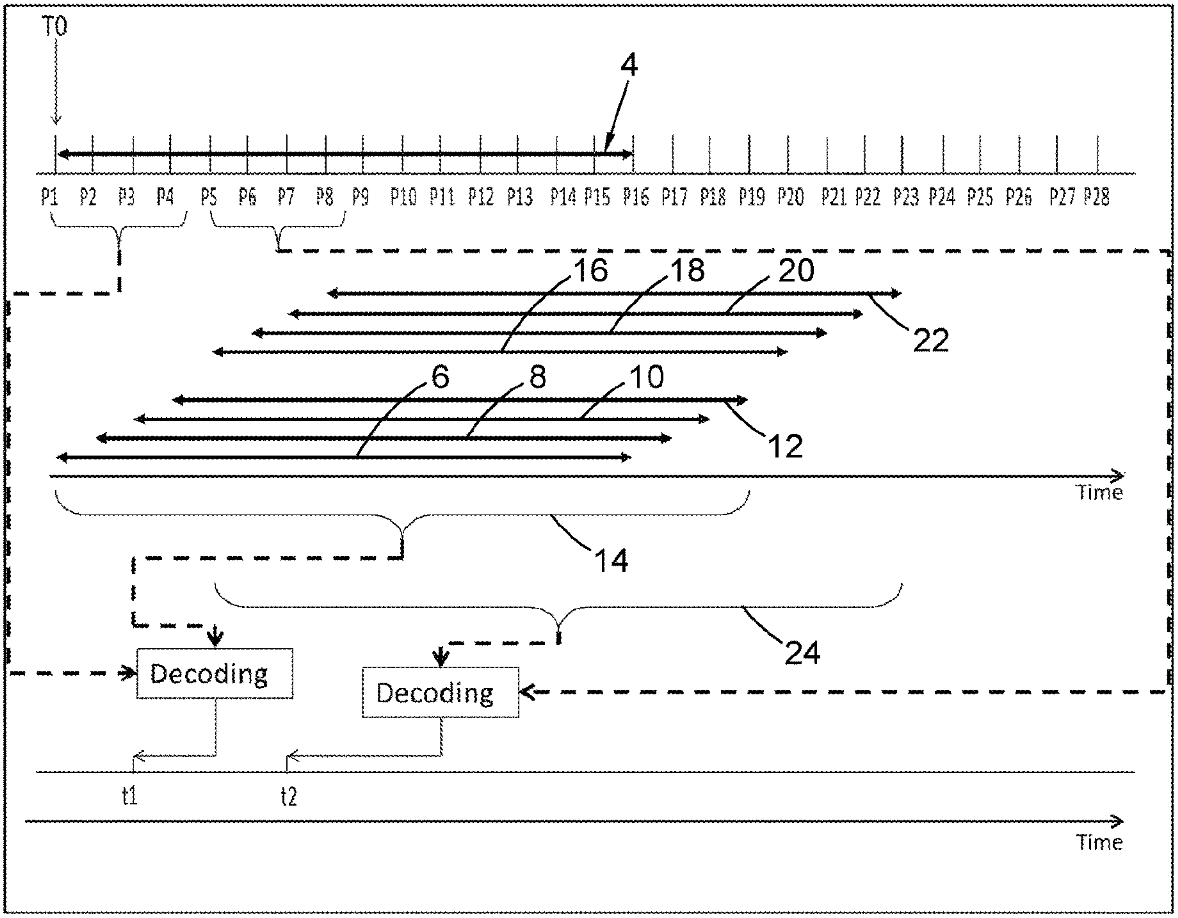
FIG. 5 shows the same technique as FIG. 4, except that it has been extended to show how the data for the fifth to eighth ToF pushes is processed.

FIG. 5 shows the same technique as FIG. 4, except that it has been extended to show how the data for the fifth to eighth ToF pushes P5-P8 is processed. Accordingly, arrow 16 illustrates the time range over which the ToF detector response may relate to ions from the fifth ToF push P5, arrow 18 illustrates the time range over which the ToF detector response may relate to ions from the sixth ToF push P6, arrow 20 illustrates the time range over which the ToF detector response may relate to ions from the seventh ToF push P7, and arrow 22 illustrates the time range over which the ToF detector response may relate to ions from the eighth ToF push P8.

As described in relation to FIG. 4, this approach results in mixed or multiplexed ToF mass spectral data. This can be seen from FIG. 5, wherein the time periods 16-22 over which ions arrive at the ToF detector from ToF pushes P5-P8 all overlap with each other for part of their respective time periods. At certain times the detector response may therefore correspond to ion arrivals that might originate from any one of the four pushes P5-P8. As described in relation to FIG. 4, the temporal spacing between pushes may be varied such that all the different pairs of pushes have different temporal spacings between them. The knowledge of how the temporal spacing between ToF pushes varies with time is then used to decode or demultiplex the ToF detector responses during the time range 24 over which it receives ions from the pushes P5-P8. The resultant decoded spectral data obtained during detector response period 24 (i.e. from pushes P5-P8) is associated with a time stamp t2.

It will be appreciated that the time periods 6-12 over which ions arrive at the ToF detector from ToF pushes P1-P4 overlap with the time periods 16-22 over which ions arrive at the ToF detector from ToF pushes P5-P8, for part of their respective time periods. At certain times the detector response may therefore correspond to ion arrivals that might originate from any one of the pushes P1-P8.

As described above, ions pulsed into the ToF mass analyser in any given ToF push may arrive at the detector up until a time after that ToF push that corresponds to the maximum time of flight of ions in that ToF push. It is therefore possible that a first ion pulsed into the ToF mass analyser in a first ToF push may arrive at the detector at the same time as a second ion pulsed into the ToF mass analyser in a later ToF push, if that second ion has a shorter time of flight than the first ion. If the time difference between another pair of ToF pushes is the same as the time difference between the first and second ToF pushes then, again, the first ion may arrive at the detector at the same time as a second ion, potentially causing information to be lost. It is to be noted that this problem may occur when the time difference between a pair of any two pushes (that are separated by less than the maximum time of flight) corresponds to the time difference between a different pair of any two pushes (that are separated by less than the maximum time of flight). The pushes in each pair of pushes need not be adjacent pushes for the problem to occur.

In order to avoid spectral confusion and minimise information loss, it is desired that all of the ions that reach the detector, in any given detector response decoding time range 14, 24, come from a set of ToF pushes, wherein every possible pair of pushes in said set that are separated from each other by a temporal spacing that is less than the maximum flight time has a unique temporal spacing. In other words, for said set of ToF pushes, all of the permutations of possible pairs of pushes that are separated from each other by a temporal spacing that is less than the maximum flight time are unique. No two such pairs of pushes have the same temporal spacing.

Therefore, the temporal spacing of any given pair of ToF pushes should not match the temporal spacings of any other pair of ToF pushes that are within at least a time range set by the time during which the pushes used in the decoding step occur plus either the maximum flight time of ions analysed in the ToF mass analyser from the first of those ToF pushes, or plus the time spread 4 of the range of times of flight for ions analysed from the first of those ToF pushes. For example, referring to FIG. 4, the temporal spacing of any given pair of (adjacent or non-adjacent) ToF pushes should not match the temporal spacings of any other pair of (adjacent or non-adjacent) ToF pushes that are within at least a time range set by the time during which the pushes P1-P4 used in the decoding step 14 occur plus either the maximum flight time of ions analysed in the ToF mass analyser from the first of those ToF pushes P1, or plus the time spread 4 of the range of times of flight for ions analysed from the first of those ToF pushes P1. Similarly, referring to FIG. 5, the temporal spacing of any given pair of ToF pushes should not match the temporal spacings of any other pair of ToF pushes that are within at least a time range set by the time during which the pushes P5-P8 used in the decoding step 24 occur plus either the maximum flight time of ions analysed in the ToF mass analyser from the first of those ToF pushes P5, or plus the time spread 4 of the range of times of flight for ions analysed from the first of those ToF pushes P5.

Although FIGS. 4-5 illustrate four pushes being used in each decoding step, other numbers of pushes may be used in each decoding step. Also, although FIG. 4 only illustrates two decoding steps, this is purely for illustrative purposes and it will be understood that higher numbers of decoding steps may be used for decoding further subsets of the ToF pushes and so as to provide more than two time stamps.

As described above, a different subset of ToF pushes is used in each decoding step 14, 24. Although not strictly required, embodiments may have the additional restriction that the mean times of adjacent ones of these subsets of pushes are separated by same time difference. For example, the mean time of pushes P1-P4 may be separated by the mean time of pushes P5-P8 by a first duration, and the mean time of pushes P5-P8 may be separated from the mean time of pushes P9-P12 by the same first duration. This results in the timestamps t1, t2, . . . tN being equally spaced which can be desirable. Alternatively, but less preferred, the mean times of adjacent subsets of pushes may be arranged to vary in a known way. This may be desirable in situations where the temporal peak width of the separator (e.g. IMS) varies with time.

The number of pushes used in each decoding step may be the same or different across part of, or the whole of, the separation experiment. It is recognised that practically there is likely to be a limited number of time stamps (t1-tN) available due to the acquisition architecture of the spectrometer. In these circumstances it is desirable to alter or select the number of pushes in each subset of pushes to thereby increase the temporal separation between timestamps and hence cover a longer separation timescale, such as separations upstream of the ToF mass analyser by scanning a mass filter (e.g. quadrupole), by m/z selective ejection from an ion trap or by a relatively long timescale IMS separation. It may be preferred that the number of pushes used in each decoding step may be the same so that the time stamps will be equally spaced.

The ToF pushes may be synchronized with the ToF detector acquisition system, such as an ADC, so that the time difference between any pair of adjacent pushes is a known integer number of sampling points (e.g. ADC sampling points) or time bins. Other, asynchronous or unknown pusher spacings are also recognized as possible, although these complicate the decoding approaches whist offering minimal benefit.

As described above, the start of the push sequence of the ToF mass analyser may be synchronized with the start of the upstream separator (e.g. with the time the ions are pulsed into an IMS device). The upstream separator may perform a plurality of separation cycles, and the ToF mass analyser may sample the ion beam eluting from the separator a plurality of times during each cycle. For each cycle, the start of the push sequence of the ToF mass analyser may be synchronized with the start of the upstream separator. The pusher temporal coding sequence may restart for each cycle.

Whilst many encoding/decoding approaches may be used, embodiments may utilise encoding approaches that employ sequences with unique temporal spacings (as described above) to control the pusher pulse spacings. The decoding approach may involve summing/combining the multiplexed data multiple times with a time shifted version of itself, where the time shifts used are derived from the pusher encoding sequences. After the time shifting step is completed, responses/features in the multi-shifted combined data set may be tested to determine a statistical basis for inclusion in the final spectrum. These approaches work quickly and efficiently, e.g. with data processing architectures found in GPUs and FPGAs, allowing data to be decoded/demultiplexed effectively in real time.

For example, to decode and determine the data relating to ions from pushes P1-P4, data obtained over the decoding time range 14 may be summed with three time-shifted versions of the same data, wherein the three time shifts correspond to the time differences between pushes P1 and P2, between P1 and P3, and between P1 and P4. The detector responses associated with ions of the same m/z but originating from different pushes P1-P4 become coherent and rise above the statistical noise. Ions arriving at the detector in the decoding time range 14 from P5-P8 will not become coherent, due to the above described restrictions on the temporal spacings between adjacent pushes. The coherent mass spectral data (i.e. that due to pushes P1-P4) can then be assigned to timestamp t1 and the remaining data considered as noise and not assigned to t1.

Similarly, to decode and determine the data relating to ions from pushes P5-P8, data obtained over the decoding time range 24 may be summed with three time-shifted versions of the same data, wherein the three time shifts correspond to the time differences between pushes P5 and P6, between P5 and P7, and between P5 and P8. The detector responses associated with ions of the same m/z but originating from different pushes P5-P8 become coherent and rise above the statistical noise. Ions arriving at the detector in the decoding time range 24 from other pushes (before P5 and after P8) will not become coherent, due to the above described restrictions on the temporal spacings between adjacent pushes. The coherent mass spectral data (i.e. that due to pushes P5-P8) can then be assigned to timestamp t2 and the remaining data considered as noise and not assigned to t2.

The pusher timing variation or encoding sequence may be repeated, but subject to the above restrictions. For example, the encoding sequence of P1-P20 can be repeated for P21-P40, as the range of times of flight 4 of the ions (16 pushes) plus the number of pushes to be decoded (4 pushes) prevent ions originating in different pushes becoming coherent.

Embodiments provide a relatively fast ion separator (upstream of the ToF mass analyser) that produces ion peaks for a particular ion population having a FWHM (i.e. a temporal width) in the range between Wmin to Wmax and that is coupled to a ToF mass analyser that has a flight time range for the ion population between Tmin and Tmax, where Tmax>(Wmax/2) or where (Wmax/2)>Tmax>(Wmin/2) and the ToF mass analyser operates at an average pusher period Tpush so that Tpush<(Wmin/12). These restrictions ensure that at least four pushes are used during the decoding process to produce at least three measurements over the FWHM of the peaks generated by the fast separator.

Examples of specific timescales of interest according to embodiments of the invention are peak widths generated by the ion separators (e.g. IMS device or a scanning quadrupole) that are less than 4 ms at FWHM coupled to a ToF mass analyser where the maximum flight times are greater than 2 ms and the ToF pushes at an average pusher period of between 15 μs and 330 μs.

Information obtained during the decoding of data associated with one time stamp can be used to inform the decoding of data associated with another time stamp. For example, the decoded spectrum from a strong region might be used to constrain the decoding in a subsequent or preceding region. Another example is to decode the data associated with two or more time-stamps together with correlated intensities.

Knowledge of the characteristics of the ion separator may be used to inform the decoding process, for example knowledge of how m/z distributions & correlations vary with separation time (e.g. IMS drift time) and sample type may be used. Another example includes knowledge of separation peak widths from the separator.

The techniques described herein are particularly applicable to a wide range of instrument geometries that incorporate ToF mass analysers having a relatively long flight path. For example, a multi-reflecting time of flight mass analyser (MRTOF) may be used as the ToF mass analyser. In such an instrument, ions are pushed into the ToF flight region and are reflected between ion mirrors multiple times before the impact on the ToF detector. Examples of various geometries that may be used according to embodiments of the present invention, with or without an MRTOF mass analyser, are shown in FIGS. 6-10.

Figure 6:
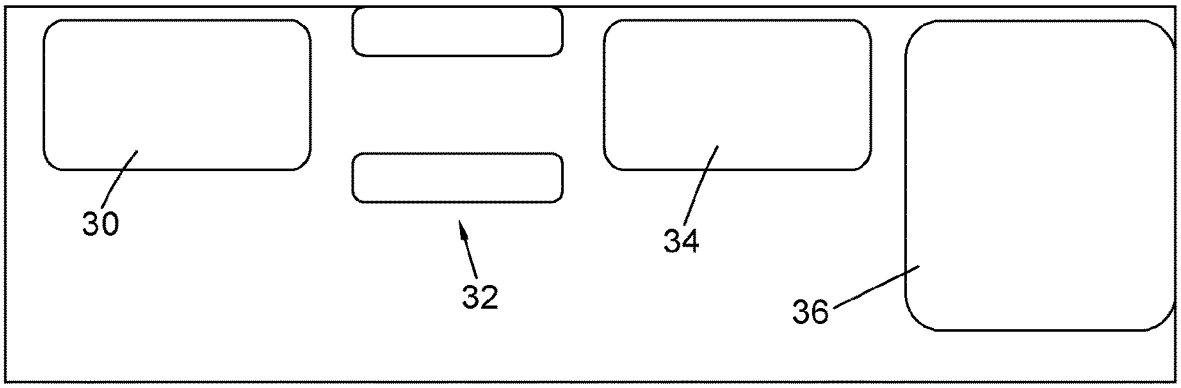
FIGS. 6-10 show schematics of embodiments of the present invention.

FIG. 6 shows a schematic of an embodiment of the present invention comprising an ion source 30, a mass filter 32 (such as a quadrupole mass filter), a fragmentation or reaction device 34 (such as a Collision Induced Dissociation cell) and a ToF mass analyser 36. In use, ions are transmitted from the ion source into the mass filter 32, which is set so as to be capable of only transmitting ions within a certain mass to charge ratio window (which may be a single mass to charge ratio or a range) at any given time. The mass to charge ratio(s) capable of being transmitted by the mass filter 32 at any instant varies with time such that ions of different mass to charge ratio are transmitted the fragmentation or reaction cell 34 at different times. The mass filter 32 therefore effectively separates the ions upstream of the ToF mass analyser 36. The ions are then fragmented or reacted in the fragmentation or reaction cell 34 so as to form fragment or product ions. The fragment or product ions (and remaining precursor ions) are then transmitted into the ToF mass analyser 36 for analysis as described above.

Figure 7:
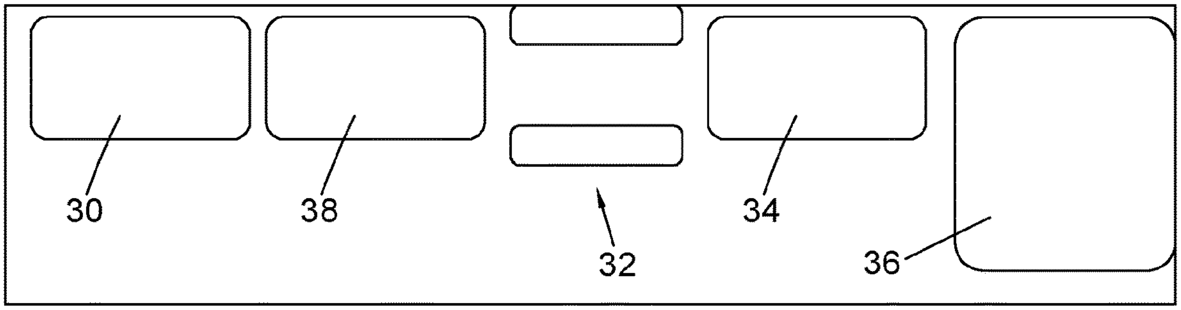

FIG. 7 shows a schematic of an embodiment of the present invention having the same components as FIG. 6, but also an ion mobility separator 38 between the ion source 30 and the fragmentation or reaction device 34. In use, ions are transmitted from the ion source 30 into the IMS device 38, which separates the ions according to their ion mobility. For example, the IMS device 38 may be a drift time IMS device and ions may be pulsed in the IMS device such that ions of different ion mobility are separated by differing levels of interaction with a buffer gas therein. The ions elute from the IMS device 38 according to their ion mobility and may pass into the (optional) mass filter 32. The mass filter 32 may be set so as to be capable of only transmitting ions within a certain mass to charge ratio window (which may be a single mass to charge ratio or a range) at any given time. The mass to charge ratio(s) capable of being transmitted by the mass filter at any instant may remain constant, or may vary with time such that ions of different mass to charge ratio are transmitted the fragmentation or reaction cell 34 at different times. The mass to charge ratio(s) capable of being transmitted by the mass filter 32 at any instant may be scanned, either once or multiple times for each ion mobility separation cycle of the IMS device (e.g. between pulses of ions into the IMS device). The onwardly transmitted ions are then fragmented or reacted in the fragmentation or reaction cell 34 so as to form fragment or product ions. The fragment or product ions (and remaining precursor ions) are then transmitted into the ToF mass analyser 36 for analysis as described above.

Figure 8:
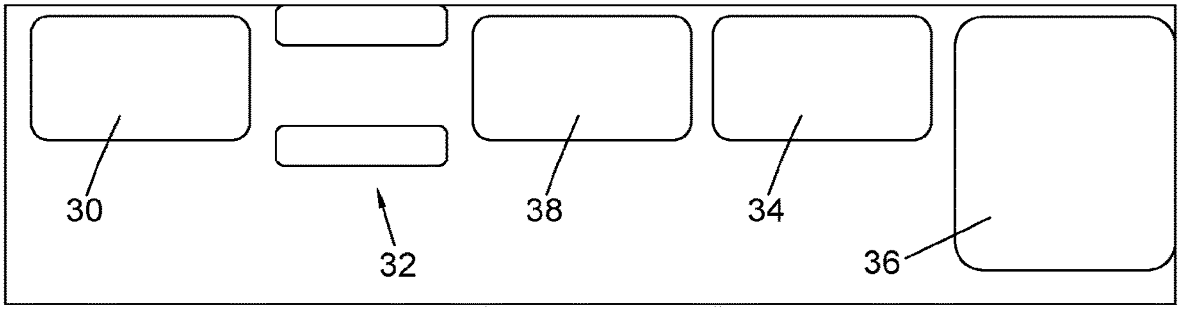

FIG. 8 shows a schematic of an embodiment of the present invention having the same components as FIG. 7, except that the IMS device 38 is downstream of the mass filter 32. In use, ions are transmitted from the ion source 30 into the mass filter 32. The mass filter 32 may be set so as to be capable of only transmitting ions within a certain mass to charge ratio window (which may be a single mass to charge ratio or a range) at any given time. The mass to charge ratio(s) capable of being transmitted by the mass filter 32 at any instant may remain constant, or may vary with time such that ions of different mass to charge ratio are transmitted the fragmentation or reaction cell 34 at different times. The mass to charge ratio(s) capable of being transmitted by the mass filter 32 at any instant may be scanned, either once or multiple times. The onwardly transmitted ions then pass into the IMS device 38, which separates the ions according to their ion mobility. For example, the IMS device 38 may be a drift time IMS device and ions may be pulsed in the IMS device such that ions of different ion mobility are separated by differing levels of interaction with a buffer gas therein. The ions elute from the IMS device 38 according to their ion mobility and may pass into the collision or reaction device 34. The ions are then fragmented or reacted in the fragmentation or reaction cell 34 so as to form fragment or product ions. The fragment or product ions (and remaining precursor ions) are then transmitted into the ToF mass analyser 38 for analysis as described above.

Figure 9:
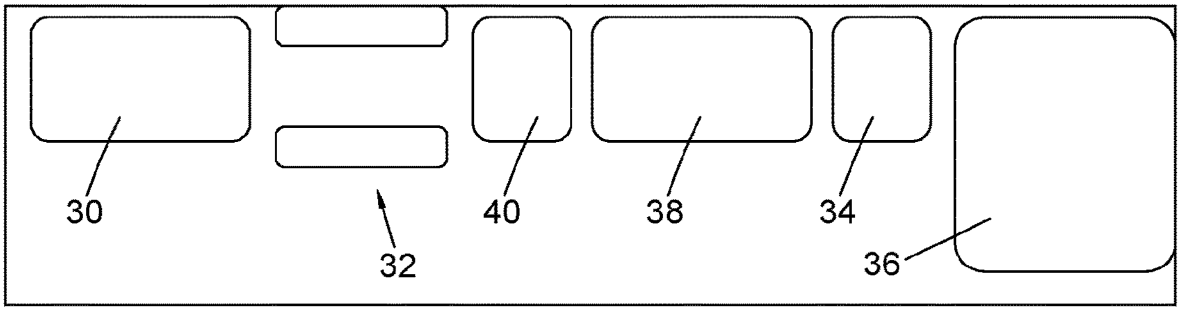

FIG. 9 shows a schematic of an embodiment of the present invention having the same components as FIG. 8, except also comprising a collision or reaction device 40 between the mass filter 32 and IMS device 38. This arrangement allows first generation fragment or product ions to be formed in the upstream collision or reaction device 40 and second generation fragment or product ions to be formed in the downstream collision or reaction device 34.

Figure 10:
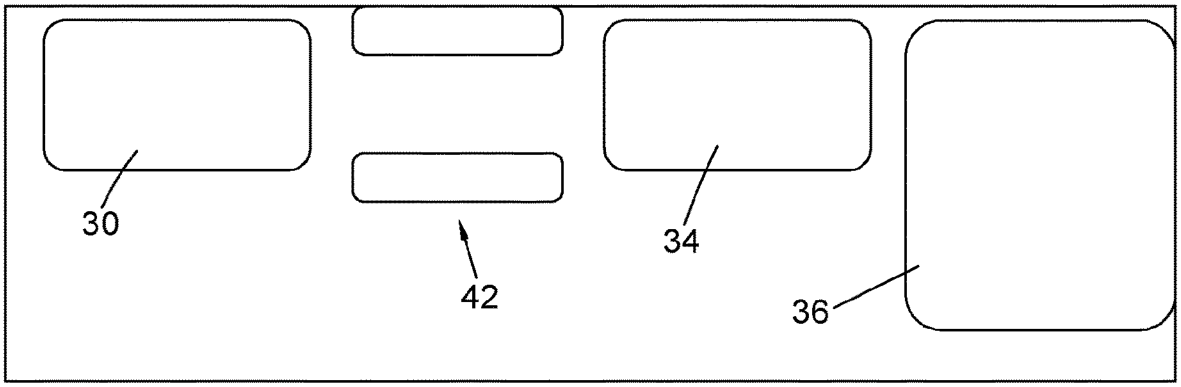

FIG. 10 shows a schematic of an embodiment of the present invention comprising an ion source 30, a mass selective ion trap 42 (such as a quadrupole ion trap), a fragmentation or reaction device 34 (such as a Collision Induced Dissociation cell) and a ToF mass analyser 36. In use, ions are transmitted from the ion source 30 into the ion trap 42, which is set so as to be capable of only ejecting ions within a certain mass to charge ratio window (which may be a single mass to charge ratio or a range) at any given time. The mass to charge ratio(s) capable of being ejected by the ion trap 32 at any instant varies with time such that ions of different mass to charge ratio are ejected from the trap and into the fragmentation or reaction cell 34 at different times. The ion trap 42 therefore effectively separates the ions upstream of the ToF mass analyser 36. The ions are then fragmented or reacted in the fragmentation or reaction cell 34 so as to form fragment or product ions. The fragment or product ions (and remaining precursor ions) are then transmitted into the ToF mass analyser 36 for analysis as described above.

Although several embodiments have been described above which include one or more collision or reaction device 34, 40, it is contemplated that the one or more collision or reaction device may be omitted, for example, and that the ToF mass analyser 36 analyses the precursor ions.

Alternative embodiments are contemplated wherein instead of separating the ions upstream of the ToF mass analyser 36 (or as well as), an operational parameter of the spectrometer is varied (e.g. scanned) with time and the ToF mass analyser 36 profiles the response of the ions. For example, ions may be transmitted into a fragmentation device (e.g. a CID device) and the energy with which the ions are fragmented may be varied over a time period. The ToF mass analyser may analyse the resulting ions a plurality of times over the time period so as to profiles the response of the ions.

The techniques described herein may be operated in tandem with previously established ToF mass spectrometry approaches such as single or multi-gain ADCs, TDCs, peak detecting ADCs, and duty cycle enhancements such as EDC & HDC modes etc.

The above described approaches focus on decoding data associated with adjacent and non-overlapping subsets of pushes (e.g. subset P1-P4 and subset P5-P8). In principle the pushes for different decoding steps could overlap in such a way that the pushes are effectively multiplexed, but still specific and unique to a subset of pushes. In principle the pushes could overlap so that the same push is non-specific to a subset and may be part of multiple subsets. An example of this is a rolling subset of pushes, e.g. one out, one in, etc.

Although the present invention has been described with reference to preferred embodiments, it will be understood by those skilled in the art that various changes in form and detail may be made without departing from the scope of the invention as set forth in the accompanying claims.

The invention claimed is:

1. A method of time of flight (ToF) mass spectrometry comprising:

pushing ions into a ToF mass analyser in a plurality of pushes, wherein the time spacing between adjacent pushes is shorter than either the longest flight time, or the range of flight times, of the ions in the ToF mass analyser from any given one of the pushes;

detecting the ions with a ToF detector so as to obtain spectral data;

decoding the spectral data to determine first mass spectral data relating to ions pushed into the ToF mass analyser by a first plurality of the pushes, and allocating this first mass spectral data to a first time-stamp, wherein said allocating the first mass spectral data to the first time-stamp comprises summing the first mass spectral data together and associating it with the first time-stamp; and decoding the spectral data to determine second mass spectral data relating to ions pushed into the ToF mass analyser by a second plurality of the pushes, and allocating this second mass spectral data to a second time-stamp, wherein said allocating the second mass spectral data to the second time-stamp comprises summing the second mass spectral data together and associating it with the second time-stamp;

wherein the first time-stamp and the second time-stamps have a time difference therebetween that is shorter than said longest flight time, or said range of flight times, in the ToF mass analyser.

2. The method of claim 1, comprising performing the first plurality of the pushes before the second plurality of the pushes.

3. The method of claim 1, comprising separating ions according to their ion mobility and/or mass to charge ratio in one or more ion separator and transmitting the separated ions, or ions derived therefrom, to the ToF mass analyser whilst performing said plurality of pushes.

4. The method of claim 3, wherein ions elute from the one or more ion separator over time as one or more ion peak, and wherein the first and second time-stamps have a time difference therebetween that is shorter than the width of each of the one or more ion peaks.

5. The method of claim 3, wherein the ion separator performs a plurality of ion separation cycles and ions from the ion separator, or ions derived therefrom, are pushed into the ToF mass analyser a plurality of times during each cycle.

6. The method of claim 3, comprising providing two dimensional nested data sets, wherein one dimension is the mass to charge ratio determined by the ToF mass analyser and the other dimension is the separation time from the one or more ion separator.

7. The method of claim 1, comprising transmitting ions in a CID fragmentation device and pushing ions from the CID fragmentation device, or ions derived therefrom, into the ToF mass analyser in said plurality of pushes, varying an operational parameter of a spectrometer that performs said method such that the ion signal at the ToF detector varies with time, and performing said step of pushing ions into the ToF mass analyser from the CID fragmentation device in a plurality of pushes whilst varying said operational parameter, wherein the operational parameter is the collision energy with which ions are subjected to in the CID fragmentation device.

8. The method of claim 1, wherein said step of decoding the spectral data to determine the first mass spectral data comprises decoding spectral data obtained by the ToF detector in a first decoding time range, wherein all of the ions that reach the ToF detector in the first decoding time range come from a first set of ToF pushes, wherein every possible pair of ToF pushes in the first set of ToF that are separated from each other by a temporal spacing that is less than said longest flight time, or within said range of flight times, has a unique temporal spacing therebetween; and/or wherein said step of decoding the spectral data to determine the second mass spectral data comprises decoding spectral data obtained by the ToF detector in a second decoding time range, wherein all of the ions that reach the ToF detector in the second decoding time range come from a second set of ToF pushes, wherein every possible pair of ToF pushes in the second set of ToF pushes that are separated from each other by a temporal spacing that is less than said longest flight time, or within said range of flight times, has a unique temporal spacing therebetween.

9. The method of claim 8, wherein the first decoding time range corresponds to the duration of time defined by the first plurality of pushes plus either said longest flight time, or said range of flight times, of the ions in the ToF mass analyser for any given one of the pushes; and/or wherein the second decoding time range corresponds to the duration of time defined by the second plurality of pushes plus either said longest flight time, or said range of flight times, of the ions in the ToF mass analyser for any given one of the pushes.

10. The method of claim 8, wherein the step of decoding the spectral data to determine first mass spectral data comprises summing the spectral data obtained over the first decoding time range with one or more time shifted version of itself and determining which spectral data in the summed data is coherent; and/or wherein the step of decoding the spectral data to determine second mass spectral data comprises summing the spectral data obtained over the second decoding time range with one or more time shifted version of itself and determining which spectral data in the summed data is coherent.

11. The method of claim 1, wherein pushes that occur at least in the duration corresponding to the first plurality of pushes plus said longest flight time, or said range of flight times, have unique temporal spacings therebetween.

12. The method of claim 1, wherein each of the first and/or second plurality of pushes is a number of pushes selected from: ≥3; ≥4; ≥5; ≥6; ≥7; ≥8; ≥9; or ≥10.

13. The method of claim 1, wherein the number of pushes in the first plurality of pushes is the same as the number of pushes in the second plurality of pushes.

14. The method of claim 1, comprising decoding the spectral data to determine third mass spectral data relating to ions pushed into the ToF mass analyser by a third plurality of the pushes, and allocating this third mass spectral data to a third-time-stamp; wherein the second time-stamp and the third time-stamps have a time difference therebetween that is shorter than said longest flight time, or the range of flight times, in the ToF mass analyser;

wherein the mean time of the first plurality of pushes is separated by the mean time of the second plurality of pushes by a first duration, and the mean time of the second plurality of pushes is separated from the mean time of a third plurality of pushes by substantially the same first duration.

15. The method of claim 1, wherein the ToF mass analyser is a multi-reflecting time of flight mass analyser.

16. The method of claim 1, comprising using the first mass spectral data at the first time-stamp and/or the time of the first time-stamp to identify the ions pushed into the ToF mass analyser in the first plurality of pushes, or to identify ions from which they are derived; and/or comprising using the second mass spectral data at the second time-stamp and/or the time of the second time-stamp to identify the ions pushed into the ToF mass analyser in the second plurality of pushes, or to identify ions from which they are derived.

17. A ToF mass spectrometer comprising:

a ToF mass analyser having a pusher configured to push ions into the ToF mass analyser in a plurality of pushes, wherein the time spacing between adjacent pushes is shorter than either the longest flight time, or the range of flight times, of the ions in the ToF mass analyser from any given one of the pushes;

an ion detector for detecting the ions so as to obtain spectral data;

one or more processor configured to decode the spectral data to determine first mass spectral data relating to ions pushed into the ToF mass analyser by a first plurality of the pushes and to store the first mass spectral data associated with a first time-stamp in a memory, wherein said storing the first mass spectral data associated with the first time-stamp in a memory comprises summing the first mass spectral data together and associating it with the first time-stamp; and one or more processor configured to decode the spectral data to determine second mass spectral data relating to ions pushed into the ToF mass analyser by a second plurality of the pushes and to store the second mass spectral data associated with a second time-stamp in a memory, wherein said storing the second mass spectral data associated with a second time-stamp in the memory comprises summing the second mass spectral data together and associating it with the second time-stamp;

wherein the first time-stamp and second time-stamps have a time difference therebetween that is shorter than said longest flight time, or said range of flight times, in the ToF mass analyser.

* * * * *